(12) United States Patent
Hilmerson

(10) Patent No.: US 10,843,718 B1
(45) Date of Patent: Nov. 24, 2020

(54) CONSTRUCTION SAFETY RAILING ASSEMBLIES, COMPONENTS, AND METHODS FOR STORAGE, TRANSPORT, AND INSTALLATION

(71) Applicant: Debra Lee Hilmerson, Prior Lake, MN (US)

(72) Inventor: Debra Lee Hilmerson, Prior Lake, MN (US)

( * ) Notice: Subject to any disclaimer, the term of this patent is extended or adjusted under 35 U.S.C. 154(b) by 0 days.

(21) Appl. No.: 16/870,867

(22) Filed: May 8, 2020

Related U.S. Application Data

(63) Continuation of application No. 16/828,904, filed on Mar. 24, 2020, which is a continuation of application
(Continued)

(51) Int. Cl.
*B62B 1/00* (2006.01)
*B62B 5/00* (2006.01)
(Continued)

(52) U.S. Cl.
CPC .............. *B62B 5/0093* (2013.01); *B62B 3/04* (2013.01); *B62B 3/108* (2013.01); *E04G 5/001* (2013.01);
(Continued)

(58) Field of Classification Search
CPC ........... E04G 5/001; E04G 5/004; E04G 5/00; E04G 21/32; E04G 21/3223; E04G 21/3228; E04G 21/3233; E04G 21/3242; B62B 5/0093; B62B 5/00; B62B 2203/60; B62B 2203/70; B62B 3/108; B62B 3/04; B62B 3/00; B62B 3/02; B62B 3/002; B62B 3/005; B62B 3/14; B62B 3/102; B62B 3/1472; B62B 3/1476; B62B 3/16
See application file for complete search history.

(56) References Cited

U.S. PATENT DOCUMENTS 4,952,114 A * 8/1990 Langer ................... E04G 5/004
414/608
5,018,629 A * 5/1991 Lamar ..................... B65D 19/08
211/194
(Continued)

*Primary Examiner* — James M Dolak
(74) *Attorney, Agent, or Firm* — Fantastic IP Consulting; Eduardo E. Drake

(57) ABSTRACT

The construction industry ranks among the largest and most dangerous industries in the world. To promote worker safety, government regulations require use of fall protection equipment, such as railings, many of which are expensive, wasteful, and/or time consuming to use. Accordingly, the present inventor devised some alternatives. One exemplary system incorporates a dual post base plate configured for attachment to a concrete floor via a single concrete anchor bolt, instead of the multiple bolts used conventionally, thereby reducing assembly time and cost. Another embodiment includes a rolling cart assembly which stores the rails in a side-by-side vertical arrangement and the base plates in an interleaved sequence, promoting easy access during installation and inventory control during disassembly and storage. Additionally, some embodiments include four stacking posts that extend upward from the cart, enabling multiple carts to be stacked vertical on atop the other to save space on construction sites.

20 Claims, 22 Drawing Sheets

Related U.S. Application Data

No. 16/529,621, filed on Aug. 1, 2019, now Pat. No. 10,597,057, which is a continuation of application No. 16/024,418, filed on Jun. 29, 2018, now abandoned, which is a continuation-in-part of application No. 29/640,861, filed on Mar. 16, 2018.

(60) Provisional application No. 62/589,469, filed on Nov. 21, 2017, provisional application No. 62/526,930, filed on Jun. 29, 2017.

(51) Int. Cl.
  *B62B 3/04* (2006.01)
  *B62B 3/10* (2006.01)
  *E04G 5/00* (2006.01)

(52) U.S. Cl.
  CPC ....... *B62B 2203/60* (2013.01); *B62B 2203/70* (2013.01)

(56) References Cited

U.S. PATENT DOCUMENTS

| | | | | |
|---|---|---|---|---|
| 6,669,213 | B2 * | 12/2003 | Woerner | B62B 3/002 |
| | | | | 280/47.35 |
| 6,955,384 | B1 * | 10/2005 | Good | E04G 5/004 |
| | | | | 296/3 |
| 7,448,634 | B1 * | 11/2008 | Raub | A47F 5/083 |
| | | | | 108/108 |
| 7,878,338 | B2 * | 2/2011 | Maxson | E04G 5/004 |
| | | | | 211/41.15 |
| 9,826,710 | B1 * | 11/2017 | McNew | A01K 1/0017 |
| 9,955,782 | B2 * | 5/2018 | Rue | B44D 3/00 |
| 10,597,057 | B1 * | 3/2020 | Hilmerson | E04G 5/001 |
| 10,624,454 | B1 * | 4/2020 | Kreinest | A47B 81/005 |
| 10,647,342 | B2 * | 5/2020 | Johnson | B62D 51/04 |
| 10,696,315 | B2 * | 6/2020 | Monk | B62B 3/12 |
| 10,745,915 | B2 * | 8/2020 | Callahan | B62B 3/16 |

* cited by examiner

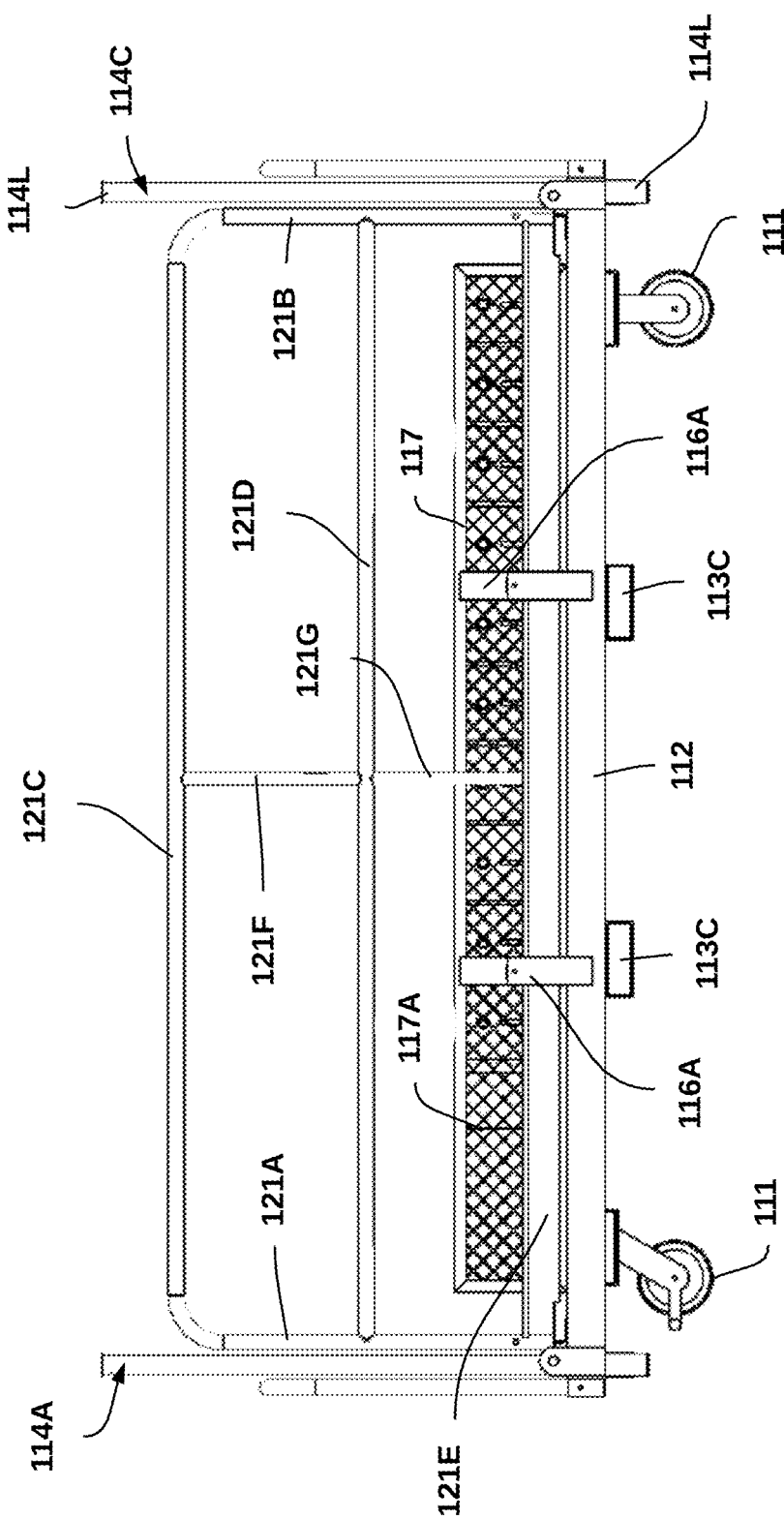

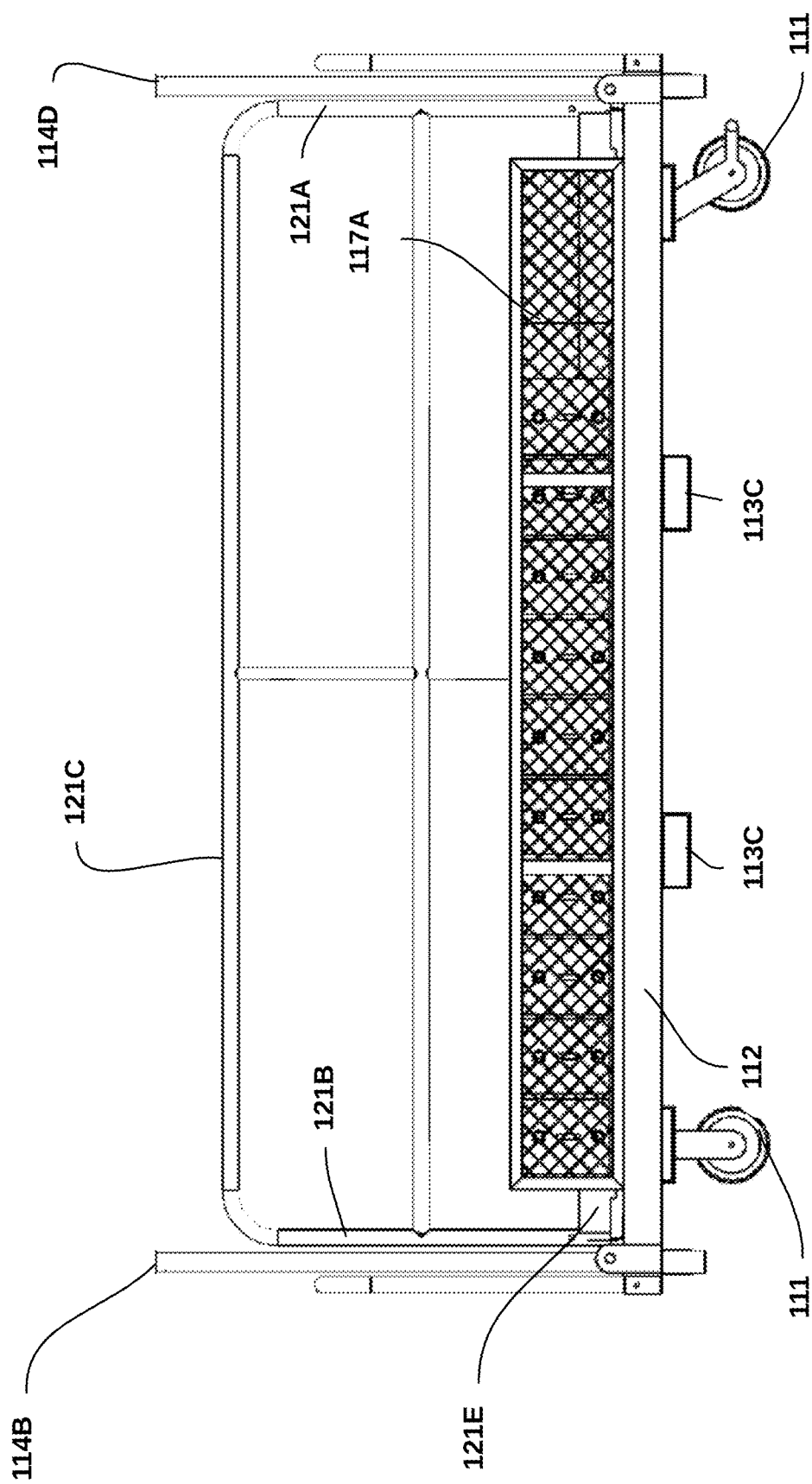

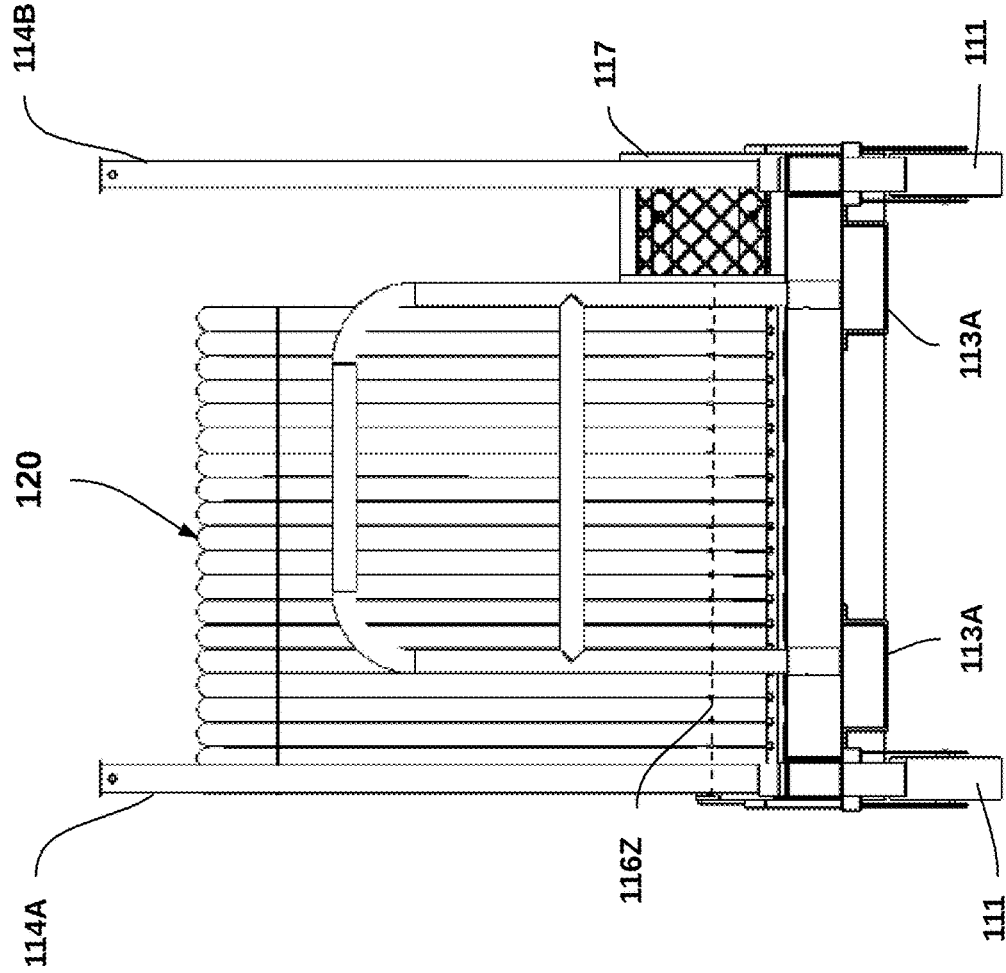

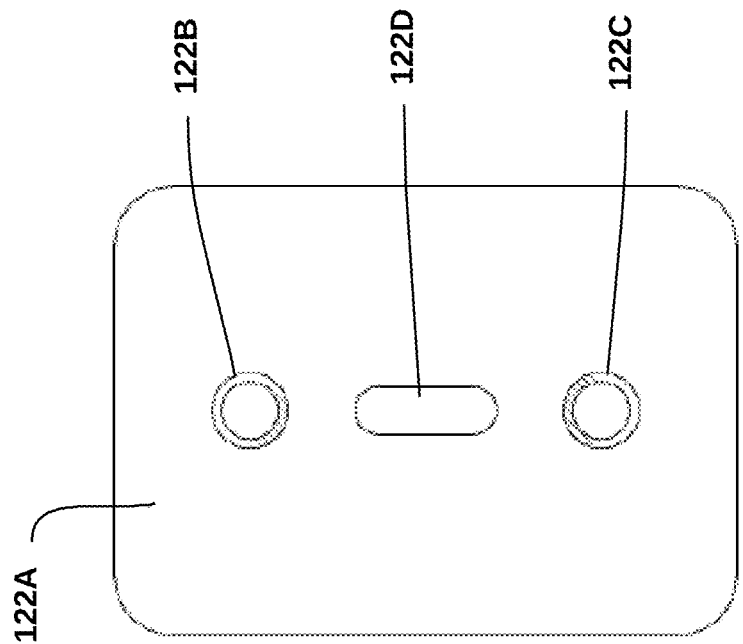
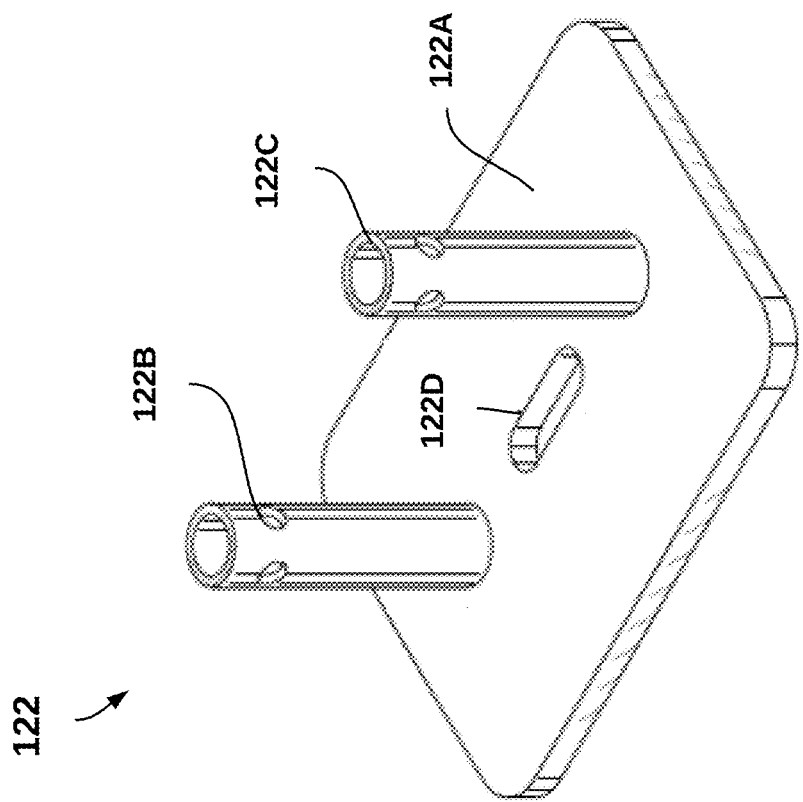
FIG. 1H
FIG. 1G

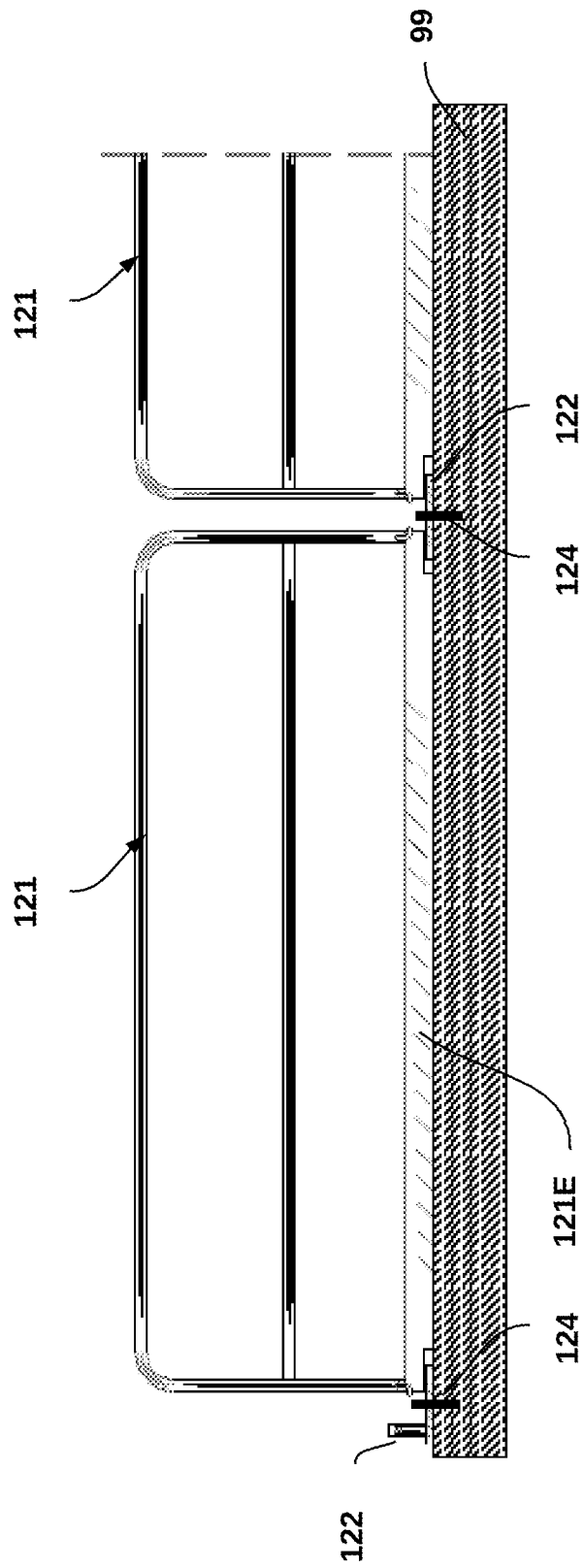

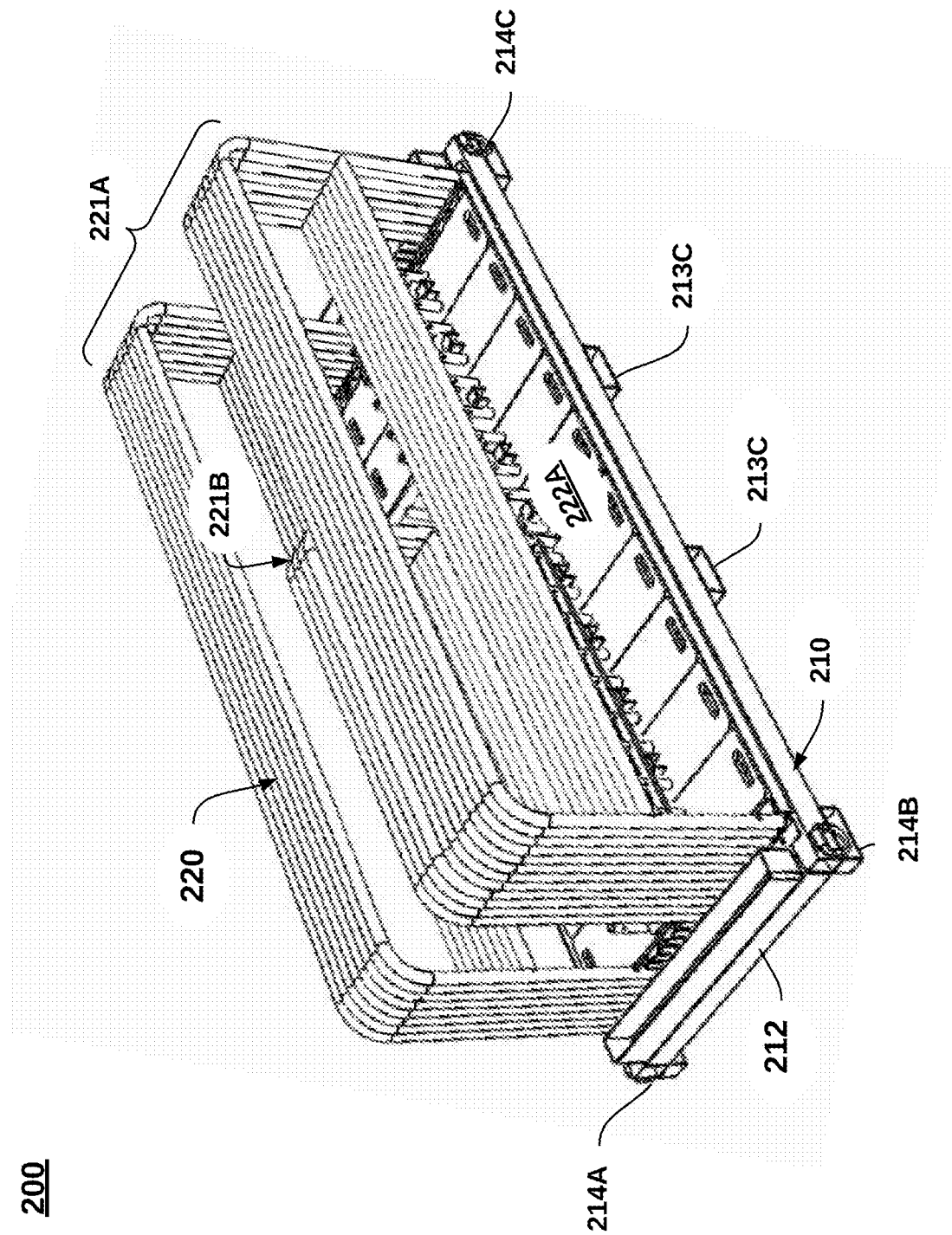

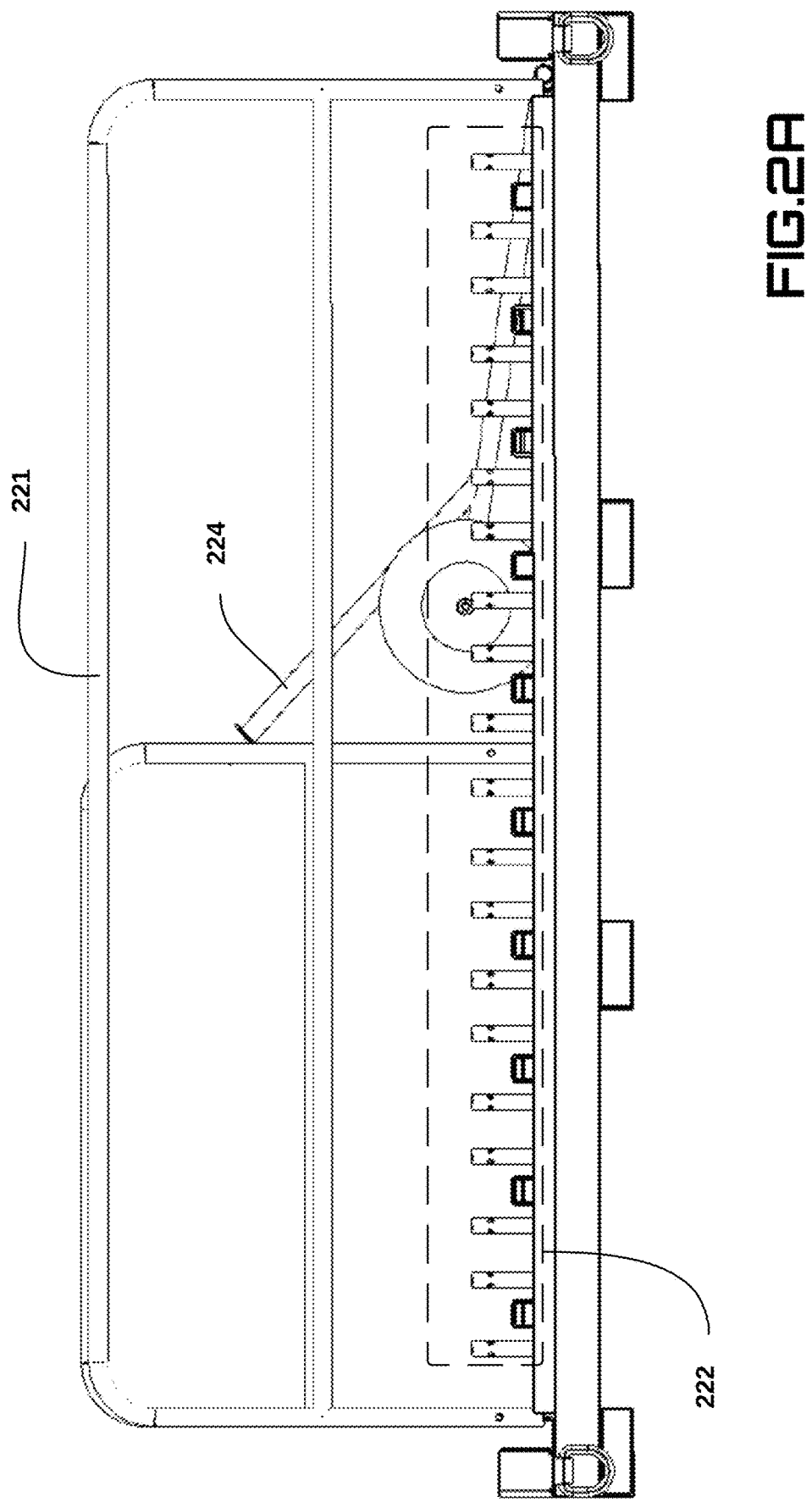

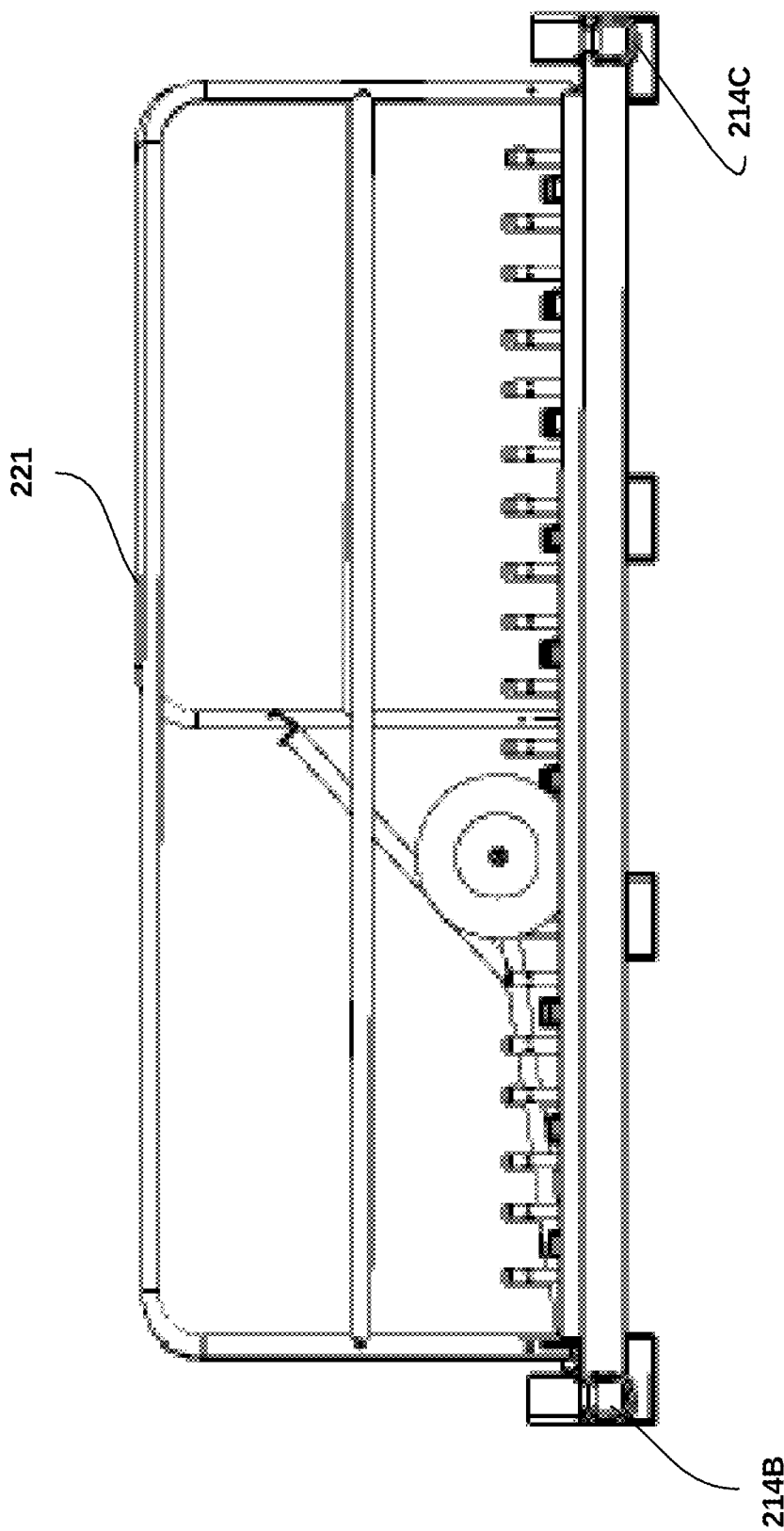

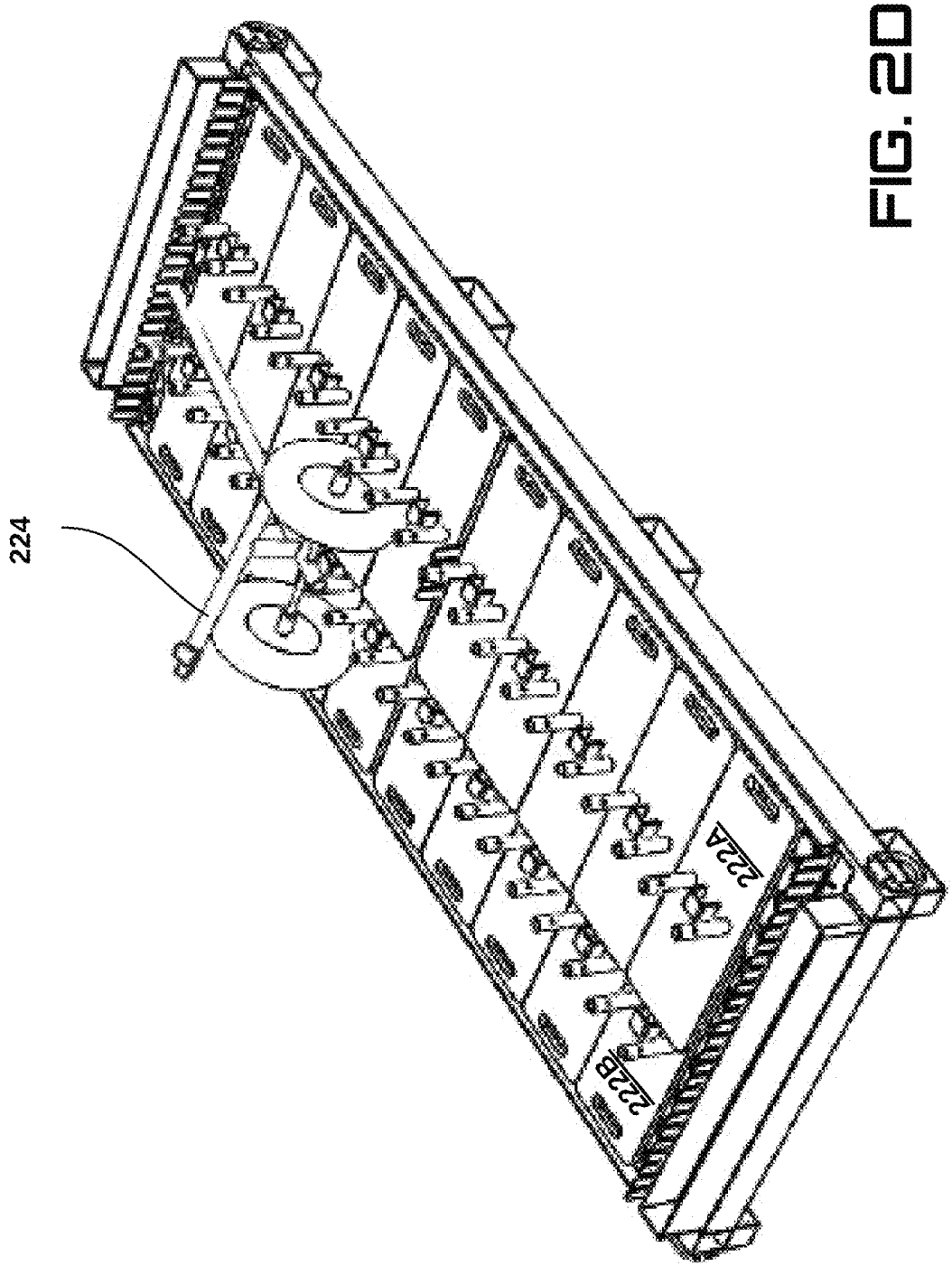

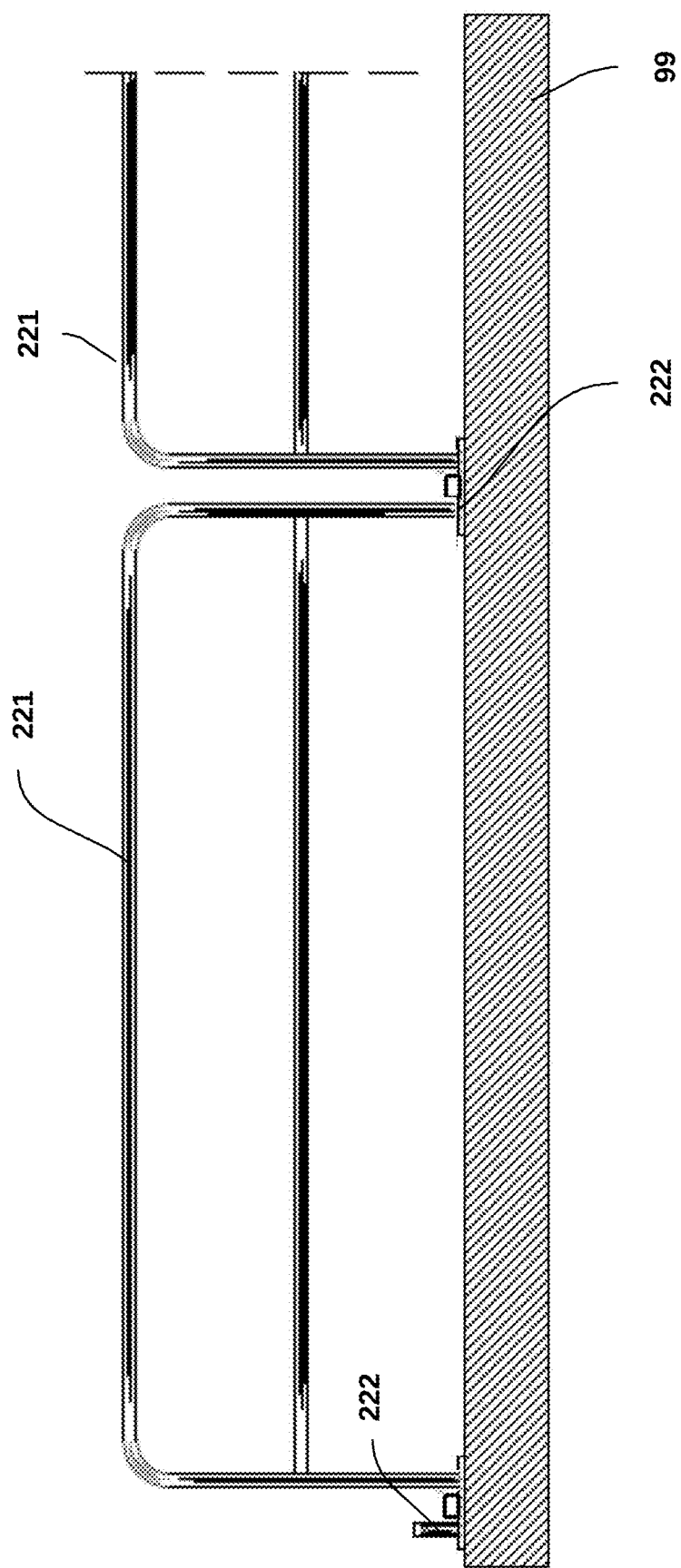

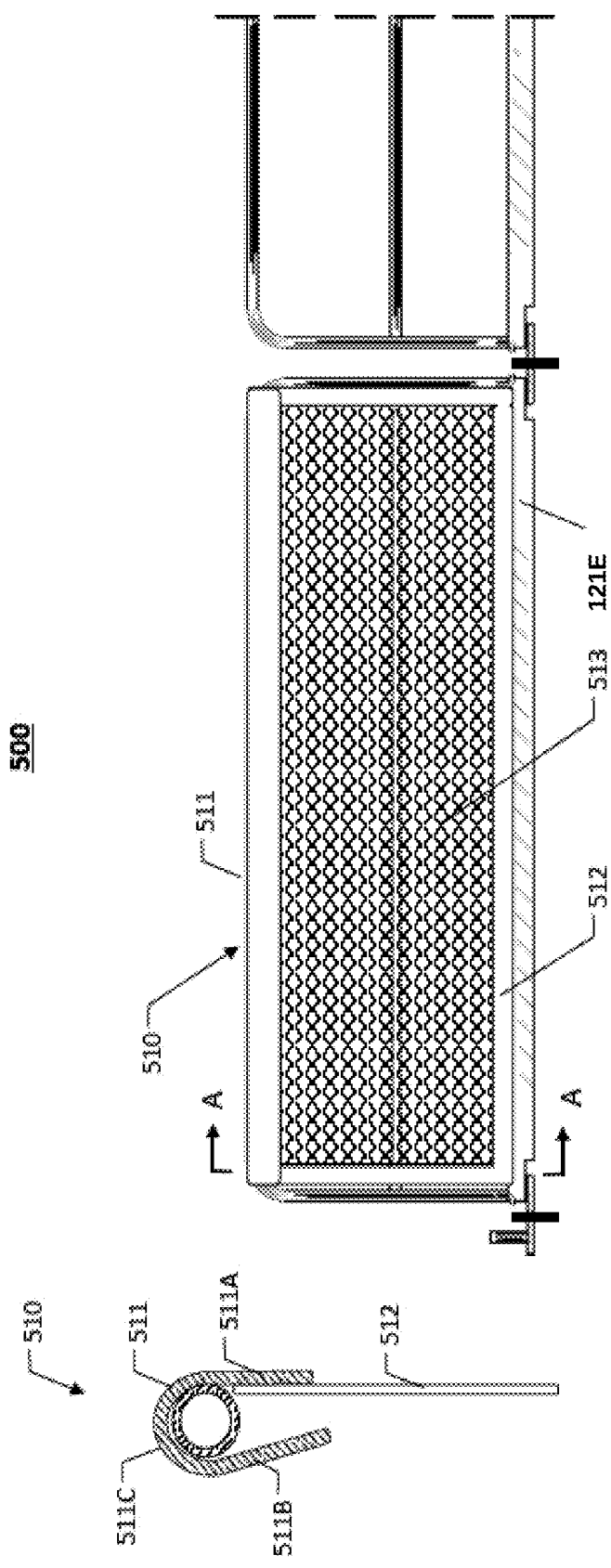

CONSTRUCTION SAFETY RAILING ASSEMBLIES, COMPONENTS, AND METHODS FOR STORAGE, TRANSPORT, AND INSTALLATION

RELATED APPLICATIONS

This application claims priority to U.S. patent application Ser. No. 16/828,904 filed Mar. 24, 2020, which is a continuation of U.S. patent application Ser. No. 16/529,621 filed Aug. 1, 2019 (now U.S. Pat. No. 10,597,057), which is a continuation of U.S. patent application Ser. No. 16/024,418 filed Jun. 29, 2018. The '418 application claims priority to Provisional Patent Applications 62/526,930 filed Jun. 29, 2017, and 62/589,469 filed Nov. 21, 2017, and to U.S. Design Patent Application 29/640,861 filed Mar. 16, 2018. All these applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright © 2017, HILMERSON SAFETY SERVICES, INC.

TECHNICAL FIELD

Various aspects of this disclosure relate to safety railing, particularly temporary guard railings used for leading-edge fall protection on construction sites.

BACKGROUND

Construction is not only one of the largest industries in the world, but also one of the most dangerous in terms of deaths and injuries suffered by workers. In the U.S. alone, over twenty percent of all on-the-job deaths occur in the construction industry. Moreover, about one third of these deaths are the result of falling. As a result, many laws and regulations have been created in the U.S. as requiring construction companies to install fall protection for their workers.

For example, the Occupational Safety and Health Administration (OSHA), a U.S. government agency, requires installation of safety railing or other fall arresting equipment near the edges of open floors. Many construction sites choose the railing option.

The present inventor has recognized that many of the railing options available to construction companies suffer from at least three problems. First, many construction companies hire professional carpenters to build temporary railing structures out of new lumber and discard them in land fills at the end of the job. This is not only time consuming, but also relatively expensive and wasteful, since the fabrication process and full railing expense is incurred repeatedly from project to project. Moreover, the wooden railing structures are typically not tested for compliance with OSHA fall protection requirements, and therefore may be inadequate, exposing workers to injury and the companies that use them to potential fines.

Second, some companies use metal railing systems that can be reused from project to project, avoiding the expense of purchasing railings for every new project, but still incurring significant installation expense. For example, many companies using tubular railing systems that require bolting vertical posts or stanchions to a concrete floor using as four or more anchor bolts, with each anchor bolt requiring its own separate drilling and setting steps. This is not only expensive in terms of the labor and time, but also potentially risky as some concrete floors have internal structures that could be damage if the anchor holes are positioned incorrectly. Moreover, removing the railing system requires removing the nuts and the anchor bolts, consuming more labor and time. Still other railings systems provide long vertical tie down bolts that are hidden within the vertical tubes of the railings, not only requiring turning of the bolts to fasten the rails to their bases, but also requiring workers to physically contact the rail to confirm fastening.

Third, the present inventor recognized that conventional metal rail systems, even though reusable, are cumbersome to store and move from project to project. In particular, the rails are typically laid flat and stored on pallets in a ground-level staging area that takes up space on the construction site. The rails and mounting hardware are then lifted separately using cranes and forklifts to work areas, not only taking valuable crane and forklift time, but also subjecting the railing to damage during in the process. After being dropped in the work area, the mounting hardware and rails are then moved separately for installation. The process is reversed during de-installation, with the mounting hardware subject to loss and the rails again subject to damage as they're bundled and moved via crane or forklift to ground level for storage on the pallets.

Accordingly, the present inventor has recognized a need for a better way to provide safety railing.

SUMMARY

To address one or more of these and/or other needs or problems, the present inventor devised, among other things, one or more exemplary systems, kits, methods, devices, assemblies, and/or components related to providing safety railing on construction sites.

In some exemplary embodiments, the invention takes the form of a temporary railing assembly or kit for leading-edge construction site fall protection. One exemplary assembly includes a tubular rail structure, a rail support structure, and a concrete anchor bolt. The tubular rail structure includes two vertical stanchions and at least an upper rail, one mid rail, and a toeboard extending approximately horizontally between the stanchions. (Some embodiments include intermediate vertical supports between the upper and mid rails and between the midrail and the toe board, and still other embodiment provide one or more rail sections that are not only adjustable in horizontal length, but also include a toe board that is similarly adjustable.) The railing support structure, for example a base plate, including at least two mounting posts extending substantially vertically from a baseplate with a singular mounting slot between the two mounting posts.

Advantageously, the singular mounting slot is placed midway between and collinearly with the mounting posts, enabling the baseplate to be securely mounted to a concrete surface via a single concrete anchor bolt, as opposed to the multiple ones required by conventional railing systems. Each mounting post is configured to engage interchangeably with a lower end portion of one of the stanchions, for example by the lower end portion of the stanchion fitting over or within the length of the mounting post. A gravity locking (pig tail) pin, a span locking pin, or a toggle pin is then used to lock the stanchion to the baseplate in a visibly confirmable way, thus providing a fast and simple vertical support for the length of tubular railing. Multiple baseplates and railings can be rapidly assembled together in a variety of configurations, and then rapidly dissembled and reused, all by a single worker of minimum skill and experience, saving not only time and money, but also providing safe, reliable and eco-friendly fall protection for the construction site.

Additionally, some embodiments include one or more non-penetrating railing support structures. For example, one embodiment provides a system having two types of railing support structures, each with at least two mounting posts and having a weight sufficient to meet the relevant OSHA leading-edge fall protection standards. One type for use in joining two rail sections in a generally collinear arrangement includes rectangular base plate attached to the base plate, with the length dimension of the base plate arranged generally perpendicular to a line defined by the two mounting posts. The other type, which is configured to joining two rail sections in a generally transverse or a perpendicular arrangement, has the length dimension of the rectangular base plate arrange transverse or perpendicular to the line of the two mounting posts.

Further, some embodiments of the invention includes a rolling storage cart, which stores the rails, railing support structures, and/or other installation equipment or hardware, for example, fastening pins, anchor bolts, and power drill or wrench. In some variants, the cart includes a rectangular base frame having two opposing pairs of vertical storage studs or mounts at or near the ends of the cart for engaging with the end stanchions of the rail sections and holding them in an upright, generally vertical position. In some embodiments, the vertical storage studs or mounts are configured from two parallel steel plates that extend the width of the base frame, each with a series of equi-spaced notches defining the storage studs. The base frame further includes forklift slots for engaging with a fork lift, and D-rings for attachment to crane lift rigging.

Moreover, four stacking posts extend upward, for example from the corners, to engage with a congruent base frame of another storage cart, allowing storage of one cart atop another to save space. In some embodiments, a longitudinal storage bin extends along one side of the cart to store the rail support structures in an organized way, not only to facilitate secure storage and visual inventory verification, but also to facilitate efficient installation and removal of the railing. In some versions, the rail support structures, for example base plates, are stored in an alternating or tessellated arrangement to facilitate access as well as visual inventory count.

Some aspects of the invention include one or more methods for installation, removal, and/or storage. One exemplary method entails storing rails on two carts, one stacked vertically atop the other, with each cart storing a set of rails in an upright, generally vertical orientation. At least one of the carts is then lifted via forklift or crane to an elevated floor of a building site, requiring leading edge fall protection per OSHA or other regulatory requirements. The cart is then rolled proximate to a leading edge, and two holes are drilled in a surface near the leading edge. Anchor bolts are installed and first and second bases plates are removed from the cart, positioned over corresponding ones of the two holes, and fastened via the anchor bolts to the surface. A single rail section, removed from the cart, is then installed, with one of its vertical stanchions fitted over a mounting post of the first base plate and another of its vertical stanchions fitted over a mounting post of the second base plate. After the rail section is pinned to the base plates, the cart is rolled closer to one of the base plates, and another hole is drilled for another anchor bolt, which is used to attach a third base plate to near the leading edge. A second rail section is removed from the cart, with two of its vertical stanchions fitted over mounting posts on the second and third baseplates. In some embodiments, the cart can be used to distribute multiple pairs of base plates along a leading edge, and then workers can later drill the concrete and anchor bolt each baseplate in succession.

Some embodiments further provide a storage pallet rack for storing multiple non-penetrating baseplates, for example 20, in an organized compact fashion that facilitates visual inventory and secure transport via crane and/or forklift. Notably, in some embodiments, the pallet rack includes a pallet base supporting at least two parallel cross members. The cross members, which are spaced approximately the length of a baseplate, include at least two pairs of opposing vertical slots that engage and support corresponding baseplates turned on edge, like plates in a dishrack. The posts of the baseplates are oriented horizontally, or more generally transverse to the plane of the pallet rack. Some embodiments also store one or more of the bases face down on top of two or more of the bases standing on edge.

BRIEF DESCRIPTION OF THE DRAWINGS

Various embodiments are described herein with reference to the following attached figures (Figs). These figures are annotated with reference numbers for various features and components, and these numbers are used in the following description as a teaching aid, with like numbers referring to the same or similar features and components.

FIG. 1A is a left side view of the FIG. 1 system, corresponding to one or more embodiments of the present invention.

FIG. 1B is a right side view of the FIG. 1 system, corresponding to one or more embodiments of the present invention.

FIG. 1D is front view of the FIG. 1 system corresponding to one or more embodiments of the present invention.

FIG. 1G is a perspective view of a base plate portion of the FIG. 1 system corresponding to one or more embodiments of the present invention.

FIG. 1H is a top view of a base plate portion of the FIG. 1 system corresponding to one or more embodiments of the present invention FIG. 1I is a front view of a rail assembly portion of the FIG. 1 system corresponding to one or more embodiments of the present invention.

FIG. 2 is a perspective view of another exemplary safety railing storage, transport, and installation system, corresponding to one or more embodiments of the present invention.

FIG. 2A is a left side view of the FIG. 2 system, corresponding to one or more embodiments of the present invention.

FIG. 2B is a right side view of the FIG. 2 system, corresponding to one or more embodiments of the present invention.

FIG. 2D is a top perspective view of the pallet and base plate portions of the FIG. 2 system corresponding to one or more embodiments of the present invention.

FIG. 2H is a front view of a rail assembly portion of the FIG. 2 system, corresponding to one or more embodiments of the invention.

FIG. 5 is a front view of a rail assembly portion of the FIG. 1 or FIG. 2 system including a debris screen attachment and corresponding to one or more embodiments of the invention.

FIG. 5A is a cross-sectional view of the FIG. 5 rail assembly taken along line A-A, corresponding to one or more embodiments of the present invention.

DESCRIPTION OF EXEMPLARY EMBODIMENTS

Figure 1:
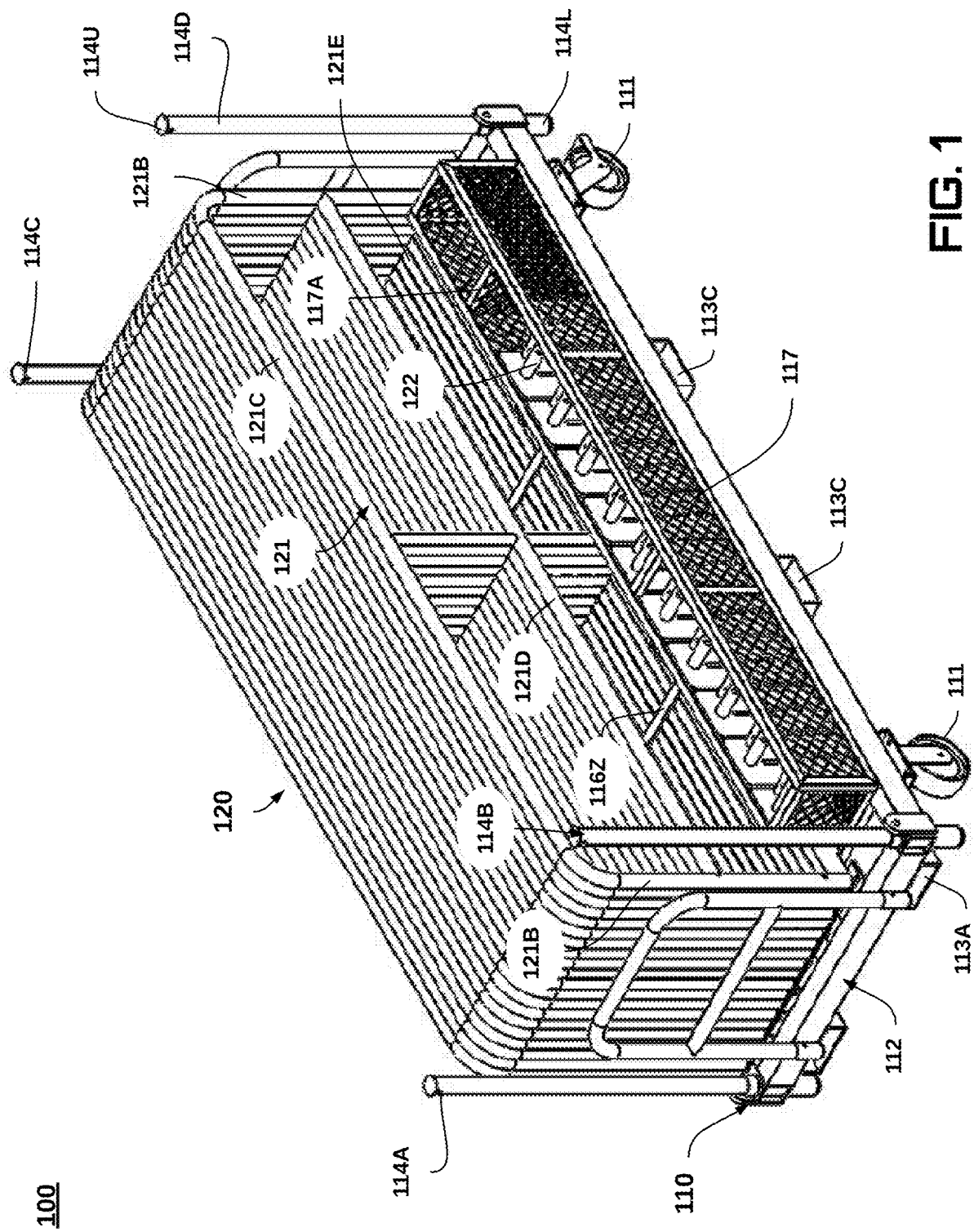
FIG. 1 is a perspective view of an exemplary safety railing storage, transport, and installation system, corresponding to one or more embodiments of the present invention.
Figure 1C:
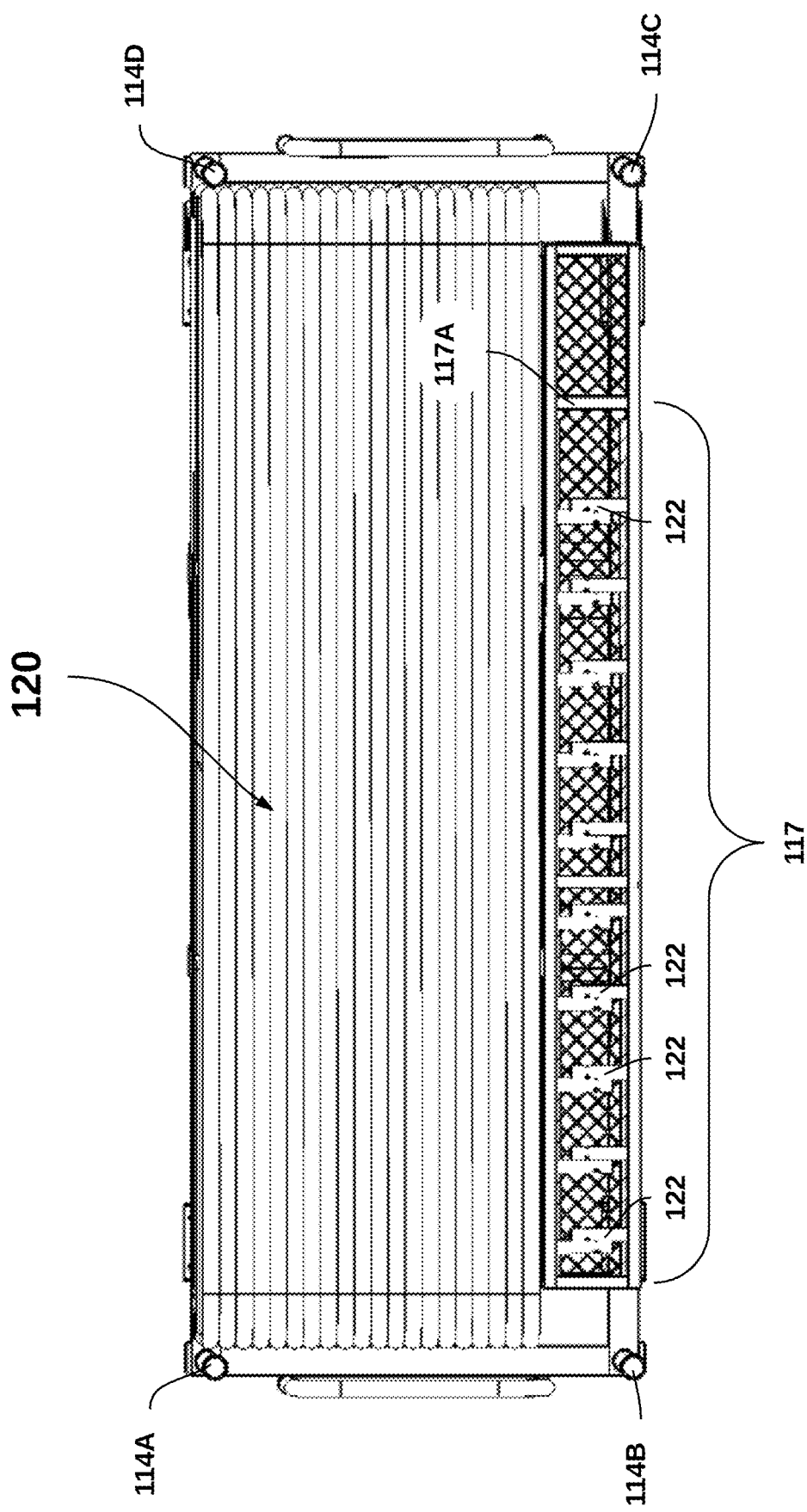
FIG. 1C is top view of the FIG. 1 system corresponding to one or more embodiments of the present invention.
Figure 1E:
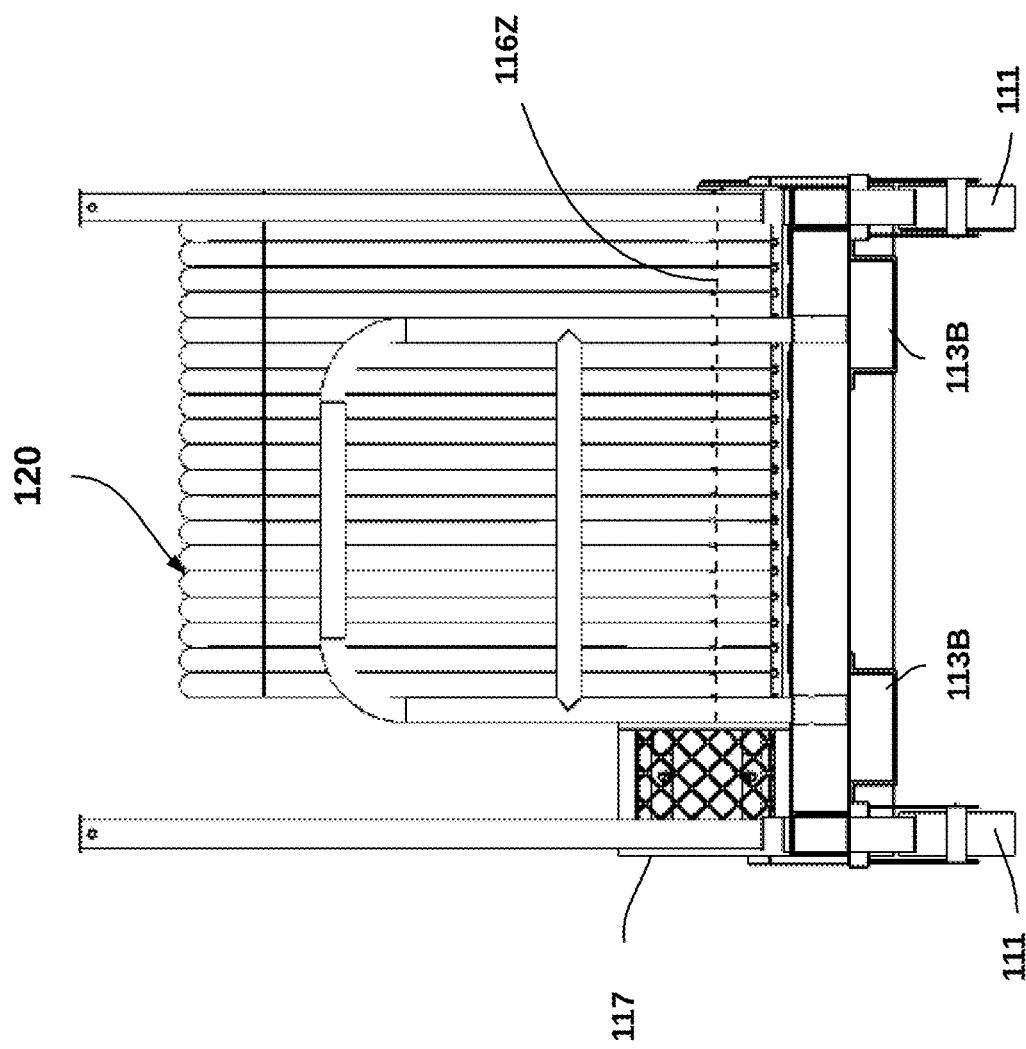
FIG. 1E is back view of the FIG. 1 system corresponding to one or more embodiments of the present invention.
Figure 1F:
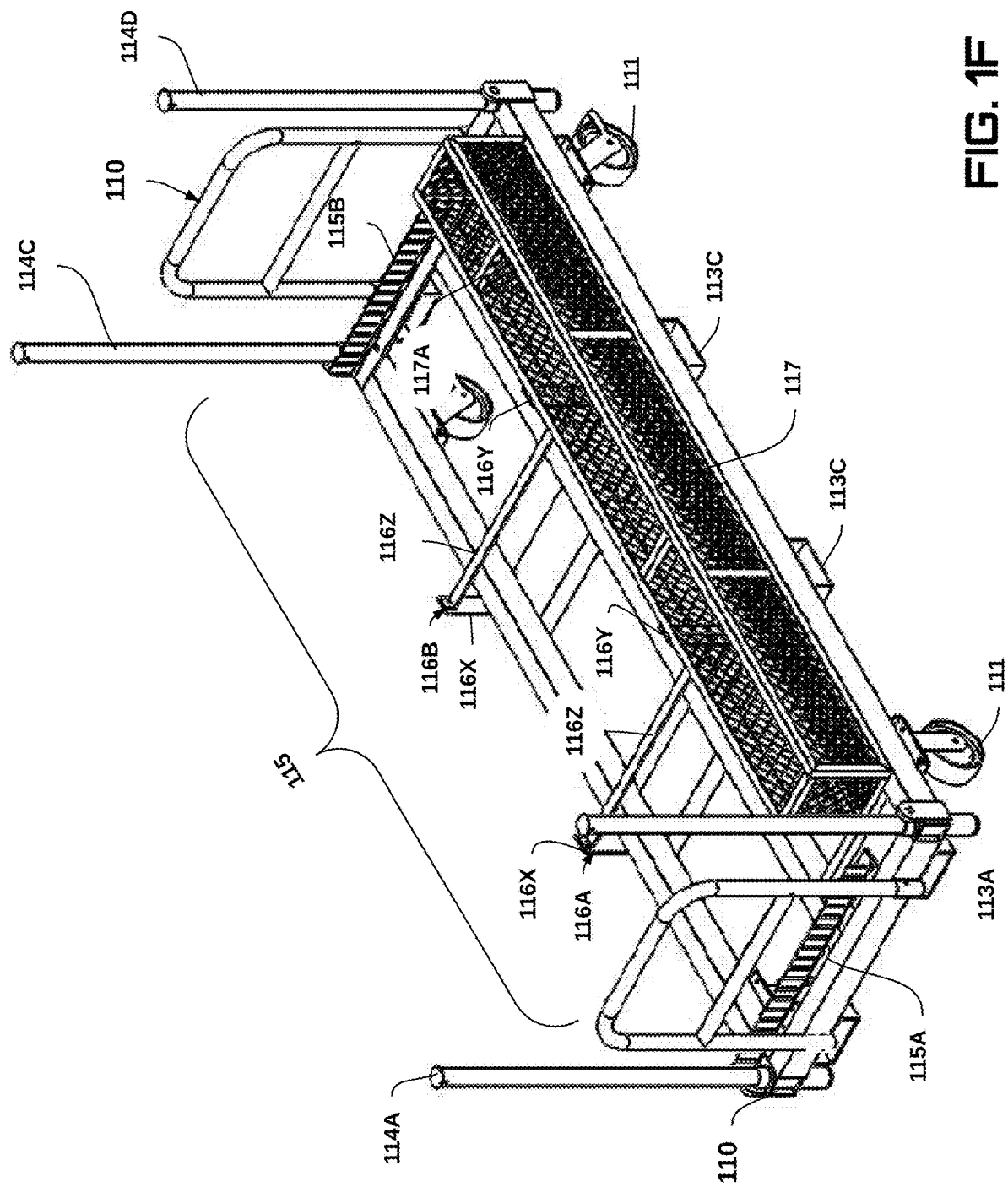
FIG. 1F is a perspective view of a rail cart portion of the FIG. 1 system corresponding to one or more embodiments of the present invention.

This document, which incorporates the drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

FIGS. 1 and 1A-1I show various views of an integrated safety railing and railing storage, transport, and installation system 100 incorporating teachings of the present invention, System 100 includes a storage, transport, and installation cart 110 and a temporary railing system 120. Cart 110, includes one or more, for example four, swiveling casters or wheels 111, each attached to an adjacent corner portion of a rectangular base frame 112. Base frame 112, formed of welded steel channels, includes three pairs of forklift channels 113A, 113B, and 113C, four cart stacking posts 114A-114D, railing storage area 115, rail retainer locks 116A and 116B, and a base plate storage area 117. Forklift channels 113A, 113B, and 113C, best viewed in FIG. 1F which shows cart 110 unloaded, allow for lifting of the cart using conventional forklift equipment. Channels 113A and 113B are positioned at the front and back ends of the cart, and channels 113C are positioned perpendicular to the longitudinal dimension of the base frame, allowing forklifting of system 100 from either the left or right side of the cart. (Some embodiments include D-rings or eyelets near or at each of the four corners of the base frame to enable lifting of system 100 or the cart by itself using a crane or other lifting equipment.)

Figure 1J:
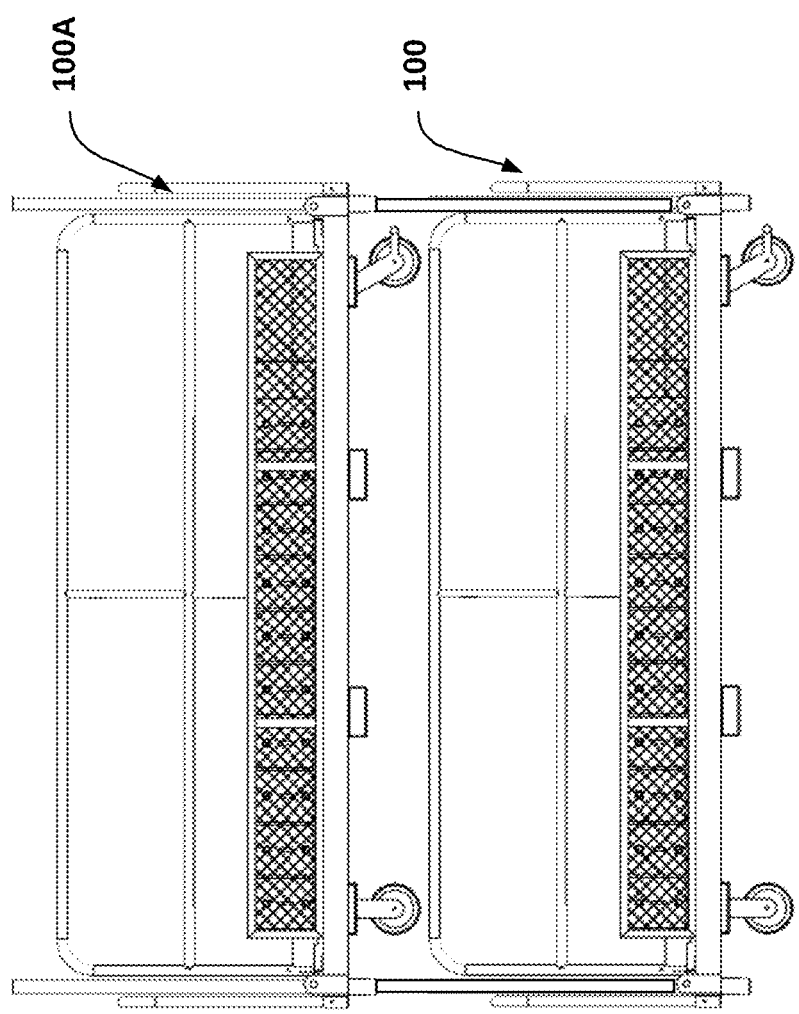
FIG. 1J is a side view of the FIG. 1 system stacked atop a second instance of the FIG. 1 system, corresponding to one or more embodiments of the invention.

Extending from the corner areas of base frame 112 are stacking posts 114A-114D, which enable cart having a similar arrangement of stacking posts to be stacked on top of cart 110 as depicted in FIG. 1J. Each post (as shown in FIG. 1) has a lower end 114L that is concave and an upper end 114U that is convex, creating a male-female engagement between corresponding posts when two carts are stacked. Notably, the ability to stack the carts saves space in warehouses and on construction sties.

Base frame 112 supports railing storage area 115, rail retainer locks 116A and 116B, and a base plate storage area 117. Railing storage area 115 includes two sets of opposing rail engagement members 115A and 115B, which are best viewed in FIG. 1F without presence of the rails. Rail engagement members 115A, are located at the front end of the cart and members 115B are positioned at the back end, with each member configured to engage in a male or female manner with a vertical stanchion or other portion of a rail section. (Some embodiments include removable handles at the front and back ends of the cart.)

In the exemplary embodiment, each rail engagement member takes the form of a vertical post or tab-like member which fits inside of a tubular formed stanchion of the rail section. More particularly, some embodiments form each set of rail engagement members to resemble a comb like structure from a single plate of steel with teeth-like tabs, each having a width slightly smaller than the inner diameter of tubing forming the vertical stanchion of corresponding rail section. Some embodiments may weld or mold a line of vertical studs or posts of any desirable cross-section to engage with the cross-sectional opening in the tubular stanchion. Yet, other embodiments configure the rail engagement members as sockets or holes that receive the ends of the vertical stanchions. Still other embodiments configure the rail engagement members as U-type brackets or opens that engage with an upper or middle portion of the vertical stanchions. Advantageously, some embodiments are configured to support the rail section in a generally vertical orientation, for example generally perpendicular to a plane defined by the base frame. This vertical arrangement with tabs or sockets facilitates inventory management of the rail sections, since user can visibly detect missing rail sections as well as number of rail sections left for completing an rail installation project by unfilled sockets or uncovered tabs or posts, signaling a need to locate the missing rail sections. For use of the railing system by rental operations, this is particularly valuable in ensuring completeness of outgoing and incoming rail systems.

Rail retainer locks 116A and 116B are configured to secure railing sections to the base frame. In the exemplary embodiment, each rail retainer lock includes two vertical locking members 116X and 116Y and a horizontal lockbar 116Z. The vertical locking members are attached to opposing sides of the base frame and extend upward to a height above a horizontal cross member, for example the toeboards, of generally congruent railing sections. The horizontal lockbar overlies and contacts the toeboards of one or more of the railing sections, with its two ends engaging in slots within the vertical locking members 116X and 116Y. In some embodiments, one end of each lockbar 116Z has a 90-degree angle region that prevents the bar from sliding all the way through one of the vertical locking members and the other end has a hole for receiving a pin to secure the lockbar in place. In some embodiments, the arrangement is sufficiently strong enough to allow the entire system to be lifted by a forklift or crane engaging with upper portions of the rails.

On the right side of the base frame, next to one pair of the vertical locking members of the rail retainer locks, is base plate storage area 117. Base plate storage area 117, a rectangular bin that extends approximately the full length of base frame 112, is configured to store base plates 122 and locking pins 123 of rail system 120, with a partition 117A separating the plates from the pins. (In some embodiments, the rectangular bin extends least 50, 60, 70, 80, or 90% of the length dimension of the cart.) More particularly, base plates 122 are stored in an interleaved manner with the posts of one base plate facing the posts of another base plate and slightly offset to prevent them from interfering with each other and to reduce the overall width of the storage bin.

Temporary railing system 120 includes a set of railing sections 121, a set of base plates 122, locking pins 123, and concrete anchor bolts 124. (Some embodiments also provide a drill kit including a power drill, appropriately sized masonry drill bit for the anchor bolts, and a depth-control device to ensure drilling of appropriately deep holes for the anchor bolts.) In the exemplary embodiment, the set of railing sections 121 includes 20 10-feet-long metal railing sections, each having two vertical end stanchions 121A and 121B, a horizontal top rail 121C, a horizontal middle rail 121D, a horizontal toe board 121E, and two vertical middle supports 121F and 121G. With the exception of the toe board, the members of each rail section are formed of steel tubing in the exemplary embodiment. The toe board, approximately 4 inches high, is formed of a folded steel sheet, and includes end notches which allow the toe board to contact a supporting substrate (typically concrete floor) and the supporting base plate, ensuring compliance with regulatory standards, such as OSHA, regarding toe boards. A top 90-degree toeboard lip, approximately 1.5 inches in width, adds increased rigidity and durability to the rail section. In some embodiments, one or more of the rail sections may be telescopically adjustable in length, through, for example, use of a 7-feet-long central section with top and middle rails and toe board that fits within the top and middle rails and toe boards of two 5-feet-long outer sections.

In some embodiments, the tubular railing structure is formed of galvanized or painted steel tubing having an outer diameter of 1.625 inches and a wall thickness of 0.120 inches (13 gauge, grade 1020 welded tube, Fy=38 KSi, Fu=52 KSi) Other tubular specifications may be used in some embodiments. For example, some embodiments use tubing with specifications in the range of +/−20% over the parameters enumerated here. One embodiment uses 1⅝" outer diameter, 14-gauge wall tube 1020 HREW, ASTM Type 1.

In some embodiments, one or more of the rail sections includes integrated or built-in toe boards notched to allow the bottom edge of the toe boards to be generally flush with the bottom surface of the base plates. Some embodiments also include kits of rail sections, single-bolt baseplates, and adjustable or telescoping spanners to close gaps that are less than a rail section in width. Still other embodiments include telescoping rail sections that are adjustable in length.

Each base plate 122, shown best in FIGS. 1G and 1H, includes a flat plate portion 122A, two mounting posts 122B and 122C, and a singular mounting hole 122D. Mounting posts 122B and 122C extend substantially vertically from plate portion 122A, and are configured to engage interchangeably with a lower end portion of one of the stanchions, for example by the lower end portion of the stanchion fitting over or within the length of the mounting post. Mounting hole 122D, which in the exemplary embodiment takes the form of a slot, is positioned advantageously midway between and collinearly with the mounting posts, enabling the baseplate to be securely mounted to a concrete surface via a singular concrete anchor bolt, as opposed to the multiple ones required by conventional railing systems.

The baseplate, in some embodiments, is formed of two galvanized or painted steel tubes welded to a galvanized steel plate, with the tubes forming the mounting posts. The tubes, of the drawn-over-mandrel variety, have outer diameters of 1.375 inches, with wall thickness of 0.1875 inches (2020 grade steel, Fy=55 Ksi, Fu=65 Ksi). Some embodiments use 11-guage (0.24) tubing. Tensile yield strength may be as low as 45 Ksi in some variations. Some embodiments make the baseplate of 0.38" 1018 HSLAF 50 steel. Exemplary dimensions provide mounting posts spaced 6.25 inches apart (center to center) and centered around the singular mounting slot on an 8×11-inch baseplate. The slot measures 2.5 inches long and 0.8225 inches or 0.56 inches wide, and the baseplate has a thickness of about 0.5 inch, for example 0.4375 inches, 0.5 inches, or 0.5625 inches. Some embodiments meet or exceed OSHA 1910.28(b)(1) and OSHA 1926.502b. Some embodiments also provide rail sections that are less than or equal to 50 lbs in weight, with lengths of 10', 7'6", and 5'.

Locking pins 123 may take any of a variety of forms to secure vertical stanchion of the railings to corresponding base plates, more precisely the mounting posts. In some embodiments, the locking pin takes the form of a gravity locking (pig tail) pin, a span locking pin, or a toggle pin is then used to lock the stanchion to the baseplate in a visibly confirmable way, thus providing a fast and simple vertical support for the length of tubular railing. Multiple baseplates and railings can be rapidly assembled together in a variety of configurations, and then rapidly dissembled and reused, all by a single worker of minimum skill and experience, saving not only time and money, but also providing safe, reliable and eco-friendly fall protection for the construction site.

Concrete anchor bolts 124 may also take a variety of forms. Some embodiments use a Powerstud+SD2, ½" 13-4.5" grade 2, zinc plated anchor from Powers Fasteners of Brewster, N.Y. or Hilti Anchor #418072 ½×3½" KH-EZ zinc plated.

FIG. 1I shows an example of two railing sections 121 of system 100 assembled. The railing sections, denoted 121 in the figure, are mounted on base plates 122 which are fastened via anchor bolts to a leading edge area of a concrete surface 99. In this example, the railing sections are shown in linear (180 degree angular relationship to each other.) However, other embodiments allow the railing to be rotated about the mounting posts to other angles. In some instances, the mounting posts have two sets of equal height opposing pin holes (not visible in this view) that are at 45 and 90 degrees relative each other. Other embodiments provide other sets of pin holes with other angular relationships for example at 30 and 60 degrees. These may be positioned at same or at lower or higher point on the vertical stanchions and mounting posts as desired.

FIGS. 2 and 2A-2H show various views of an integrated safety railing storage, transport, and installation system 200 incorporating teachings of the present invention. System 200, which is similar in many ways to system 100, includes a storage, transport, and installation pallet 210 and a temporary railing system 220. Pallet 210 includes a rectangular base frame 212. Base frame 212, formed of welded steel channels, includes one pair of forklift channels 213C, D-rings 214A-214D, railing storage area 215, and a base plate storage area 217. Forklift channels 213C, best viewed in FIG. 2E which shows pallet 110 fully unloaded, allows for forklifting the pallet (and the entirety of system 200) from either the left or right side.

Attached to the corner areas of base frame 212 are D-rings (or lifting eyes) 214A-D which allow lifting of system 200 or the pallet alone using a crane or other lifting equipment. Some embodiments include stacking posts, similar to those of system 100, enabling multiple instances of system 200 to be stacked atop each other to conserve space.

Figure 2C:
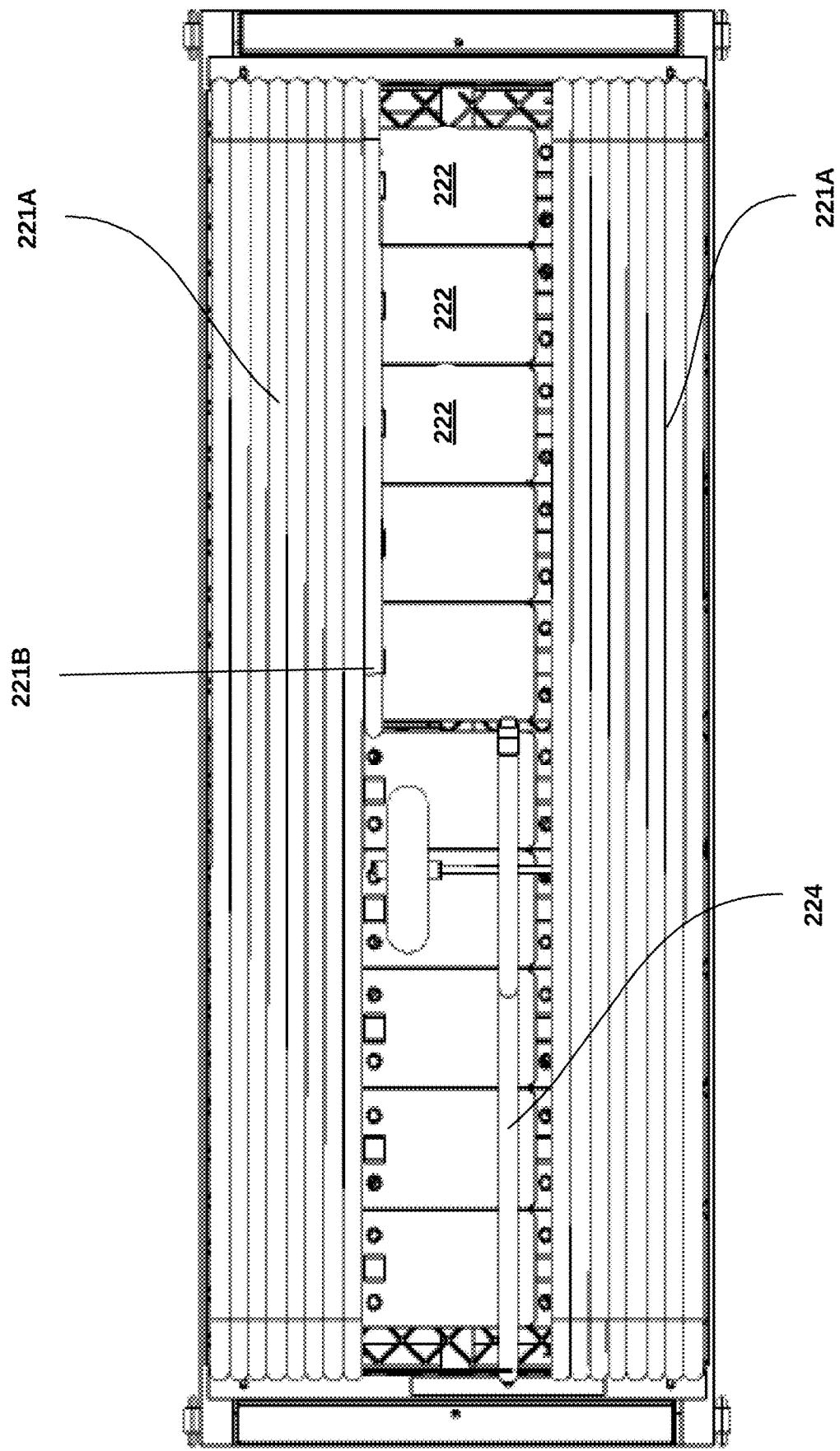
FIG. 2C is top view of the FIG. 2 system corresponding to one or more embodiments of the present invention.
Figure 2E:
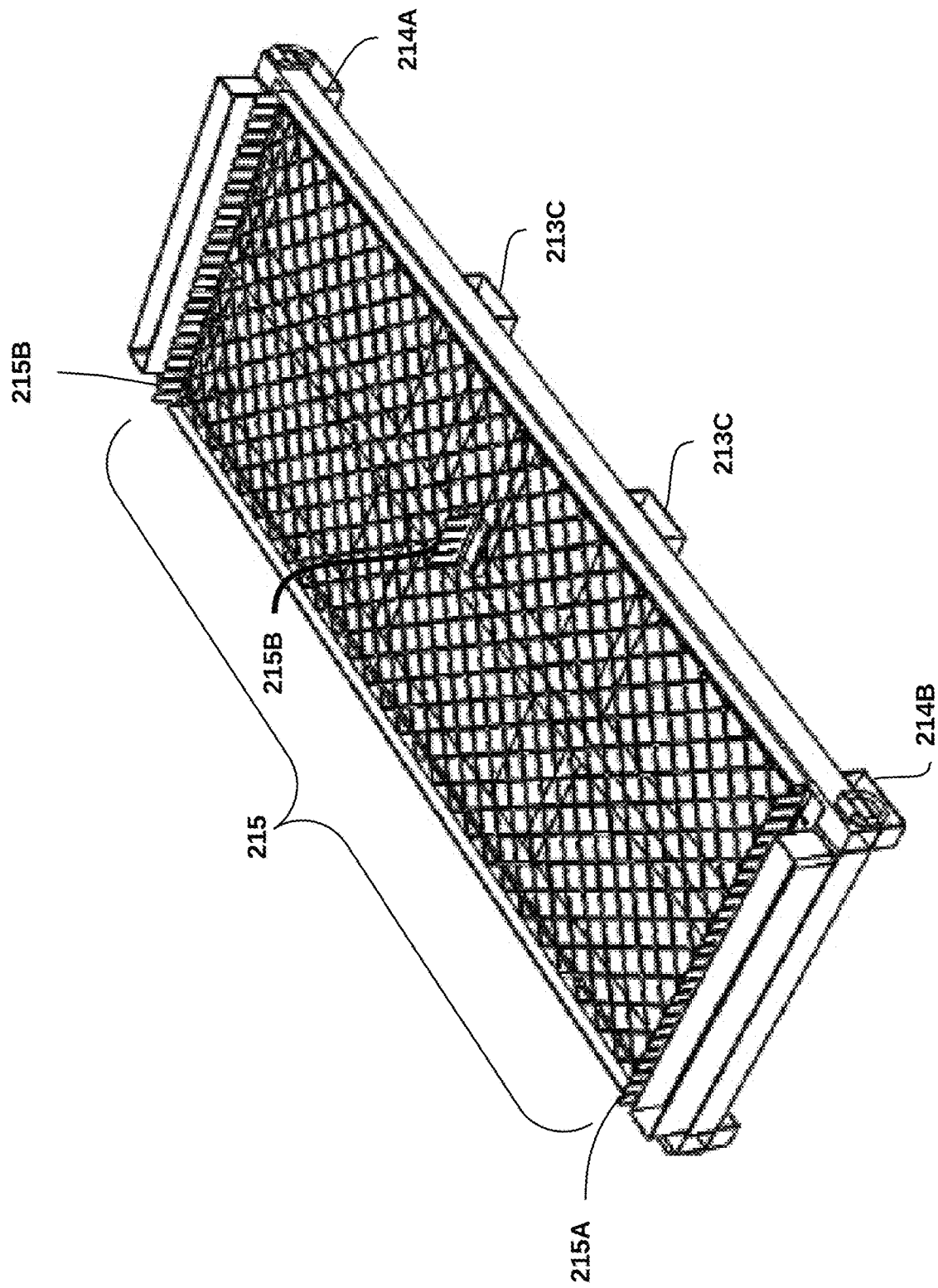
FIG. 2E is a top perspective view of a pallet portion of the FIG. 2 system corresponding to one or more embodiments of the present invention.
Figure 2G:
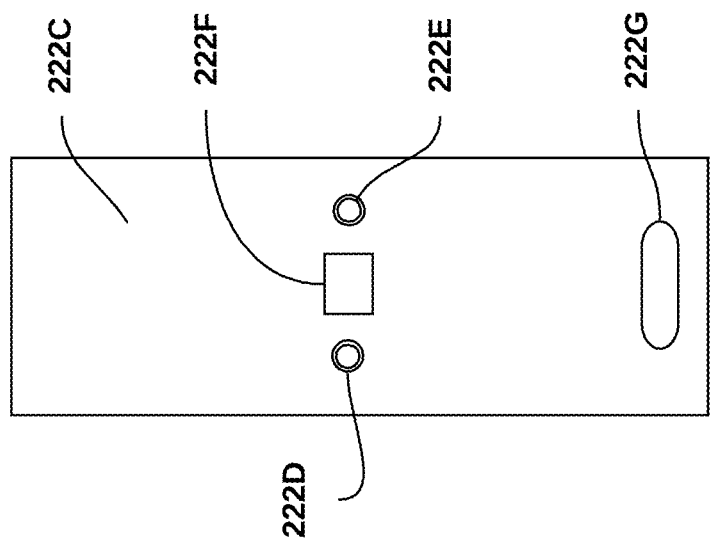
FIG. 2G is a top view of the base plate portion of the FIG. 2 system corresponding to one or more embodiments of the present invention.
Figure 2F:
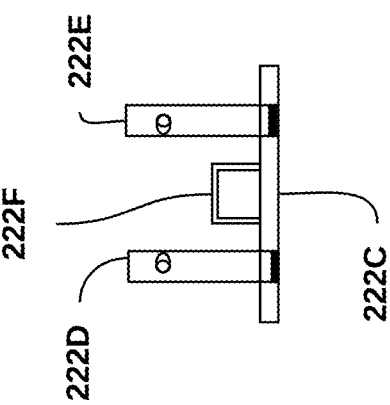
FIG. 2F is a front (and back) view of a base plate portion of the FIG. 2 system corresponding to one or more embodiments of the present invention.

Railing storage area 215 includes three sets of rail engagement members 215A, 215B, and 215C which are best viewed in FIG. 2E without presence of the railings and base plates. Rail engagement members 215A, are located at the front end of the cart and members 215B are positioned at the back end, with each member configured to engage in a male or female manner with a vertical stanchion or other portion of a rail section, as described for system 100. The spacing of rail engagement members 215A and 215B at the opposite ends of the pallet allow storage of railing sections, for example 10 feet. Rail engagement members 215C are located on a central region of the base frame, to permit storage of shorter railing sections, for example 5-feet.

Storage area 217, a rectangular area that extends approximately the full length between rail engagement members 215A and 215B and approximately the full width of base frame 212 is configured to store railing system 220.

Railing system 220 includes railing sets 221A and 221B, base plates 222, locking pins 223, and a base plate transporter 224. See FIGS. 2, 2A, and 2B for best views.

Railing set 221A includes 16 10-feet-long metal railing sections, similar to railings 121 of system 100, without the toeboard and vertical middle supports in this embodiment. (However, some other embodiments may include them.) Railing set 221B, includes four 5-feet-long railings of similar structure as railings 221A. Base plates 222, with the back portions of base plates in row 222A overlapping the back portions of the base plates in row 222B. Each base plate, weighing approximately 70 pounds, includes a flat base portion 222C, two mounting posts 222D and 222E, a lift feature 222F, and a handle 222G. The base plates function similarly to those of system 100, with the exception that they are configured for non-penetrating support of the railings sections, and include lift feature 222F. Lift feature 222F, positioned collinear with and midway between mounting posts 222D and 22E, s configured to be engaged by hook portion 224A of base plate transporter (or dolly) 224 during transport of one of the base plates from and to the pallet, for installation and de-installation of a desire position at construction site requiring leading-edge fall protection.

The transporter dimensions allow one to roll it up to either side of the pallet, with the hook portion positioned generally transverse, for example perpendicularly, to the side of the pallet for insertion underneath the lift feature (hook or loop for example) of one of the base plates. The transporter handle can then be tilted back to lift the base plate, and pulled or pushed as one directs the transporter to a destination point where one can lower the base plate to the work surface. A railing section can then be mounted to one or both of the mounting posts on the base plate, while the transporter is still connected, enabling one to adjust position of the base plate using the leverage provided by the transporter rather than the brute force of a worker, reducing the risk of back or other injury. The transporter can then be separated from the base plate and used to retrieve another base plate for installation. Handle 222G portion at front end of each base plate can be used to carry the plate by hand if desired.

FIG. 2H is a front view of an example of the railing components of the FIG. 2 system assembled. The railing sections, denoted 221 in the figure, are mounted on base plates 222 which are fastened via anchor bolts to a leading edge area of a concrete surface 99. In this example, the railing sections are shown in linear (180 degree angular relationship to each other.) However, as noted previously for system 100, other embodiments allow the railing to be rotated about the mounting posts to other angles.

Figure 3:
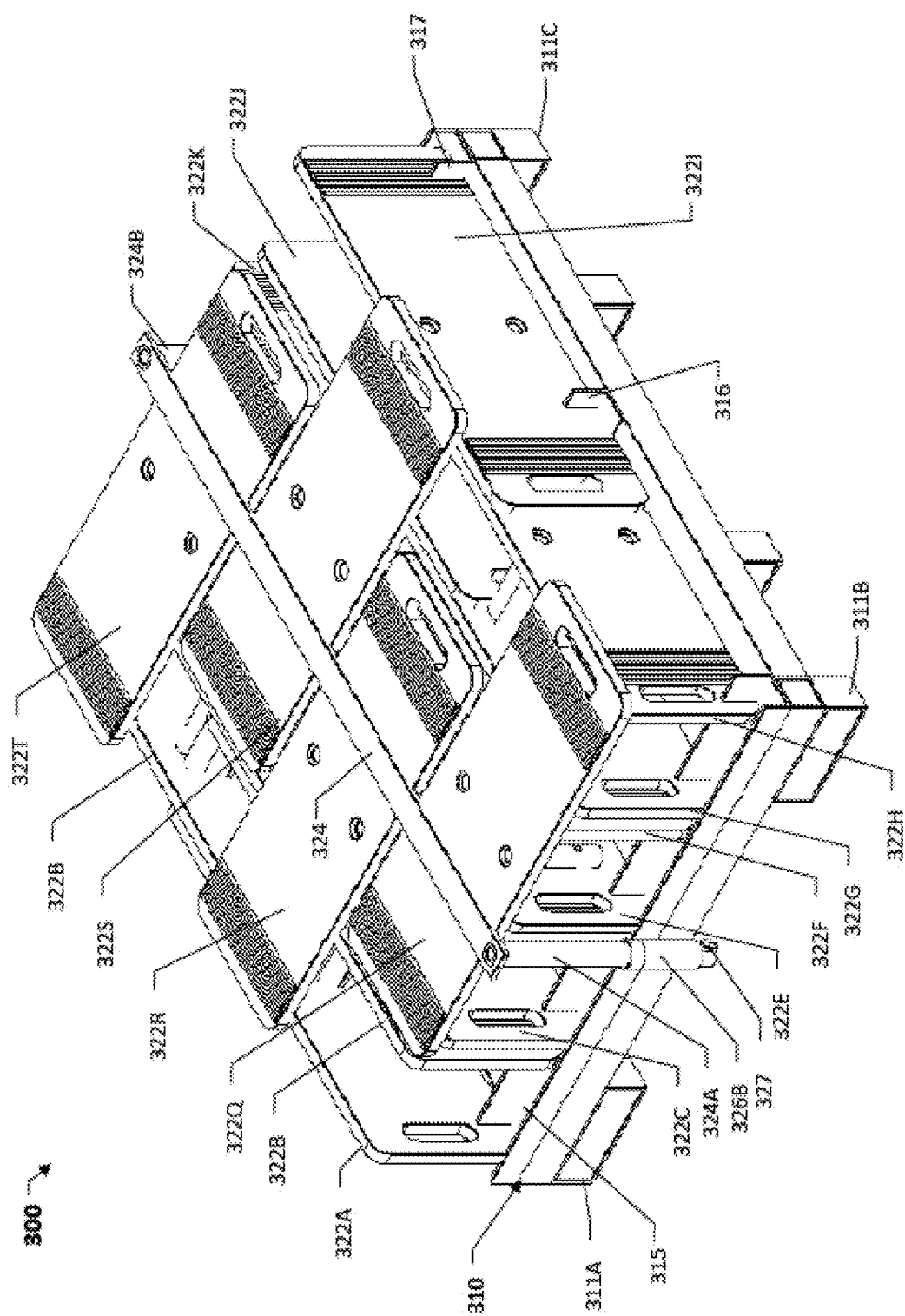
FIG. 3 is a perspective view of a baseplate storage rack assembly, corresponding to one or more embodiments of the present invention.
Figure 3A:
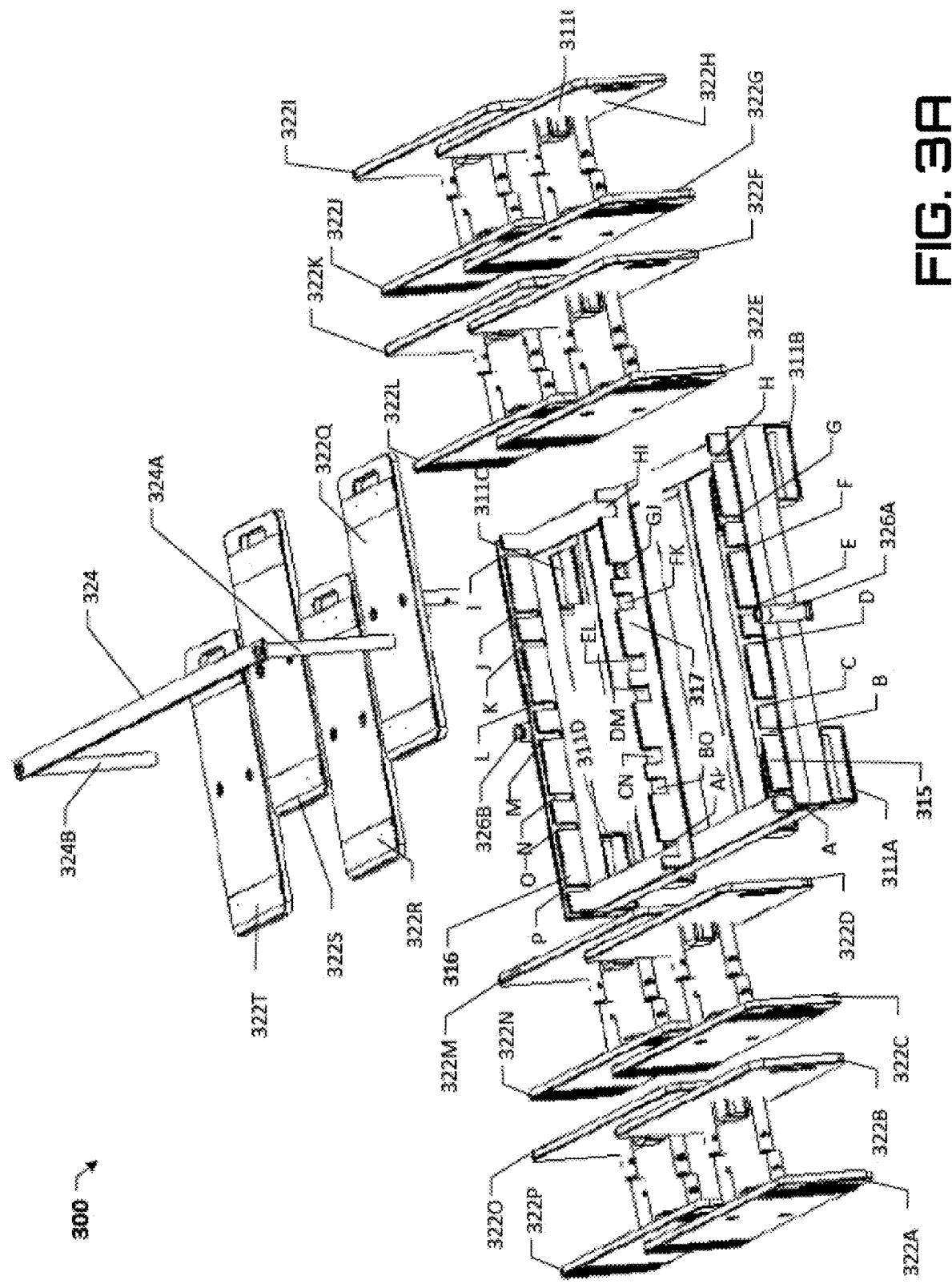
FIG. 3A is an exploded view of the FIG. 3 assembly, corresponding one on more embodiments of the invention.

FIG. 3 shows a baseplate storage rack assembly 300 including a storage rack 310 and a set of non-penetrating baseplates 322A-322T. FIG. 3A shows an exploded view of assembly 300.

Storage rack 310, which functions as a specialized pallet formed of welded and galvanized steel, includes a rectangular base pallet portion 311 having forklift channels 311A-311D and two pairs of opposing side members 312A,B, and 313A,B which are attached together, for example welded or bolted, to define the rectangular shape. Welded or bolted atop base pallet portion 311 are three generally parallel cross members (or rails) 315, 316, and 317, each taking the exemplary form of a multi-slotted bar turned on edge. (In some embodiments, the bar is formed of a right angle bracket, with one side of the bracket fastened to the pallet, and the other side including the slots described below.)

More particularly, cross members 315 and 316, both of which are mounted over and/or to respective side members 313A, and 313B and are substantially identical to each other in the exemplary embodiment, include opposing sets of slots A-H, and I-P, each approximately the same depth and width. The slot width, in some embodiments, is about 3-10% wider than the thickness of the baseplate. Cross member 317, positioned intermediate and more particularly midway between, cross members 315 and 316, includes slots AP, BO, CN, DM, EL, FK, GJ, and HI, which are 2.05-2.10 times as wide as each of slots A-P, to hold readily receive two baseplates stacked side by side.

Engaged on edge within the slots, like plates in a dishrack, are sixteen non-penetrating baseplates 322A-322P, with each baseplate supported on edge by two slots, one slot in intermediate crossmember 317 and the other slot in either crossmember 315 or 316. The alphabetic suffix A, B, C, and so forth on each baseplate reference numeral indicates which two slots in the corresponding baseplate is stored in. For example, baseplate 322A is sandwiched on edge within slots A and AI; baseplate 322B is stored on edge within slots B and BJ, and so forth. Each baseplate includes a pair of parallel mounting posts, similar to those depicted in FIG. 2G. However, for sake of clarity, they are not separately numbered in FIGS. 3 and 3A. Notably, all the mounting posts stored within slots are oriented horizontally, or more generally transverse to the plane defined by the base portion 311, with the mounting posts of the baseplates stored in the each pair of adjacent slots oriented toward each other and laterally offset to prevent the posts from interfering with each other.

Baseplates 322Q-T are stored upside down on top the baseplates stored on edge. In particular, their respective mounting posts are inserted in the spaces between the edge-mounted baseplates. A lockbar 324 having end posts 324A and 324B at its opposing ends overlays baseplates 322Q-322T, with the endposts 324A and 324B nesting in or over corresponding lock tubes 326A and 326B. Lock tubes 326A and 326B are attached, for example, bolted or welded, respectively to siderails of base pallet portion 311. One or more gravity pins or cotter pins or set crews, of which device 327 is generally representative, secures lockbar 324 to the base pallet portion, thereby securing the baseplates 322A-322T to the base pallet portion. This pallet rack assembly also provides an effective visual inventor system for the baseplate since an unfilled slot is readily visible to indicate a missing or unloaded baseplate. Likewise, the size of the pallet base is configured to require a preset number of top mounted baseplates, four in the exemplary embodiment, with the omission of one or more of the top-mounted baseplates being readily apparent. Thus, various embodiments of the baseplate storage pallet are expected to reduce loss of and damage to baseplates. Moreover, since lost and damaged baseplates hold the potential to injure workers, the pallet rack storage is also expected to improve overall jobsite safety.

Figure 4:
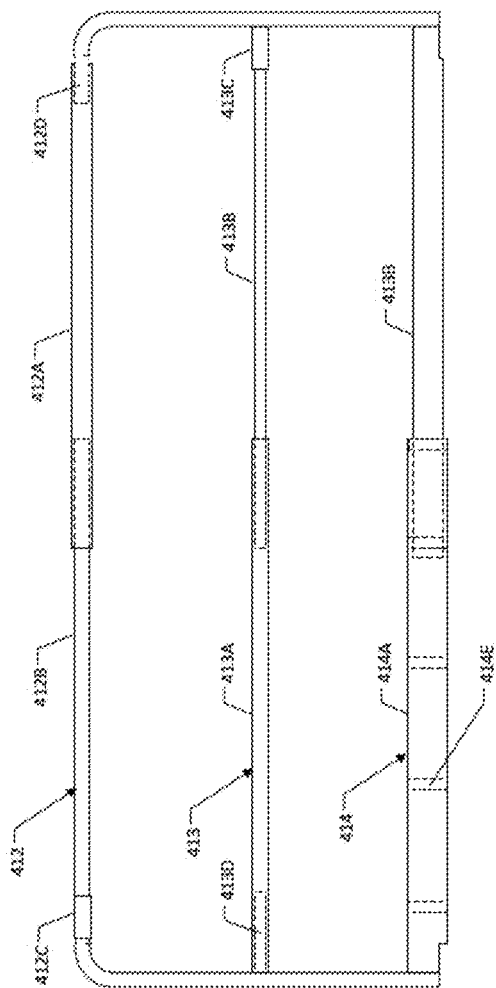
FIG. 4 is a front view of an adjustable railing section suitable for use with FIG. 1 or FIG. 2 system, and corresponding to one or more embodiments of the present invention.

FIG. 4 shows an exemplary adjustable-length railing section 400 for use with any of the railing systems described herein to replace or supplement the fixed length railings. Railing section 400, which in some embodiments adjusts from 5.5 feet to 9.0 feet, includes vertical stanchion members 410 and 411, telescoping horizontal rail assemblies 412 and 413, and a telescoping toe board assembly 414. Horizontal rail assembly 412 includes outer tubular member 412A, which has an inner diameter or channel dimensions sufficient for slidable engagement with inner tubular member 412B. Stop members 412C and 412D limit the range of slidable engagement. Similarly, horizontal rail assembly 413 includes outer tubular member 413A which as an inner diameter or channel dimensions sufficient for slidable engagement with inner tubular member 4136, with stop members 413C and 413D limiting the range of slidable engagement. Toe board assembly 413 likewise includes outer toe board member 413A and inner toe board member 413B which slidably engage. Toe board assembly 413, which in the exemplary embodiment is formed of C-channel members, includes strengthening members, of which member 414E, is representative, on the back side of outer toe board member 413A to add strength to the C-channel structure. In some embodiments, inner toe board assembly also includes strengthening members.

FIG. 5 shows a rail assembly 500 made up of components from the FIG. 1 or FIG. 2 system and including a debris screen attachment 510. Attachment 510 includes a top rail overlap portion 511, rectangular border portion 512, and a central screen portion 513. Shown best in the cross-sectional view of FIG. 5A, top-rail overlap portion 511, in the exemplary embodiment, is an extruded resilient plastic form, having front and back portions 511A and 511B and a middle portion 511C joining the front and back portions. As shown the overlap portion is molded such that in a rest state the front and back portions are biased toward each other, effectively clipping and retaining the debris screen attachment to a top railing such 121C or 221C. In some embodiments, the overlap portion may be formed of a polyvinyl or other durable weather fabric, with the front and back portions snapped, ultrasonically welded, or otherwise fastened to each other to secure the debris screen attachment to the railing. Rectangular border portion 512 is attached to the overlap portion via ultrasonic welding, stitching, snaps, and also to the periphery of central screen portion 513. Central screen portion 513 is formed of a plastic or metal mesh. In some embodiments, the lower portion of border 312 is attached to toeboard 121D via one or permanent or temporary fasteners, such as screws, rivets, or magnets. Still other embodiments may attached the screen or portions of the boarder to the middle rail of the railing.

CONCLUSION

In the foregoing specification, specific exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 20%, in another embodiment within 5%, in another embodiment within 2% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. A leading edge fall protection rail assembly, comprising:
a rectangular base frame supporting a railing storage area and a base plate storage area, with the rectangular base frame having a first set of substantially parallel members defining a length dimension and a second set of substantially parallel members defining a width dimension, with the length dimension being greater than and substantially perpendicular to the width dimension;
a set of fork channels attached to the first rectangular base frame and configured to receive forklift forks;
a first set of two or more rail sections stored side by side in a generally vertical orientation in the railing storage area, each rail section having at least first and second vertical stanchions and one or more horizontal structures extending between the vertical stanchions; and
first and second opposing sets of rail engagement members within the railing storage area and attached to the base frame, with one of the first set of rail engagement members in male or female engagement with a lower end portion of one of the first vertical stanchions and one of the second sets of rail engagement members in male or female engagement with a lower end portion of one of the second vertical stanchions; wherein the lower end portion of each of the first and second vertical stanchions comprises a tubular structure, and the first set of rail engagement members includes three or more substantially vertical projections, at least one of which is engaged with the tubular structure of the first vertical stanchion; and
a first set of two or more base plates stored in the base plate storage area, with each base plate having a plate portion and at least first and second mounting posts extending from the plate portion, with each mounting post configured to engage in a male or female fit with at least one of the vertical stanchions to support one or more rail structures in a generally vertical orientation.

2. The assembly of claim 1, wherein one of the vertical projections is positioned within an axial opening of the first vertical stanchion.

3. The assembly of claim 1, wherein at least two of the three or more vertical projections are tabs, studs, or posts.

4. The assembly of claim 1, wherein one or more of the first or second sets of rail engagement members include one or more sockets or holes that receive the end portions of the vertical stanchions.

5. The assembly of claim 1, wherein at least one of the vertical projections has a height of at least three inches measured from a top surface of the rectangular base frame, a maximal breadth of at least one inch in the width dimension, and nominal thickness in a dimension parallel to the length dimension of one-eighth of an inch.

6. The assembly of claim 1, further comprising one or more wheels rotatably attached to the base frame.

7. The assembly of claim 1, wherein the second set of rail engagement members includes three or more substantially vertical projections, at least one of which is positioned within an axial opening of the tubular structure of the second vertical stanchion.

8. The assembly of claim 1, wherein the one or more horizontal structures of each rail section include a toe board substantially parallel to the length dimension of the base frame, and the assembly further comprises a lock member extending transverse to the length dimension and contacting an upper portion of two or more toe boards, with the lock member positioned to limit vertical movement of each rail section relative to the base frame.

9. The assembly of claim 1, further including: three or more substantially vertical stacking posts extending upwardly from the rectangular base frame, with each of the posts having an upper end portion and a height measured from the base frame that is at least as great as that of the first set of rail sections.

10. The assembly of claim 9, wherein each of the vertical stacking posts has an intermediate portion extending between a lower end portion and an upper end portion, with the intermediate portion having an intermediate maximal width, and the lower end portion having a bottom maximal width greater than that of the intermediate maximal width and the upper end portion has at least a portion having a width less than the bottom maximal width.

11. A leading edge fall protection rail assembly comprising:
a rectangular base frame supporting a railing storage area and base plate storage area, with the rectangular base frame having a length dimension and a width dimension, with the length dimension being greater than and perpendicular to the width dimension;
a set of fork channels attached to the first rectangular base frame and configured to receive forklift forks;
a first set of two or more rail sections stored side by side in a generally vertical orientation in the railing storage area, each rail section having at least first and second vertical stanchions and one or more horizontal structures extending between the vertical stanchions;
first and second opposing sets of rail engagement members within the railing storage area and attached to the base frame, with one of the first set of rail engagement members in male or female engagement with a lower end portion of one of the first vertical stanchions and one of the second sets of rail engagement members in male or female engagement with a lower end portion of one of the second vertical stanchions;
a first set of two or more base plates stored in the base plate storage area, with each base plate having a plate portion and at least first and second mounting posts extending from the plate portion, with each mounting post configured to engage in a male or female fit with at least one of the vertical stanchions to support one or more rail structures in a generally vertical orientation; and
three or more substantially vertical stacking posts extending upwardly from the rectangular base frame and configured to collectively support at least a total weight of the base frame, the first set of rail sections, the first and second opposing sets of rail engagement members, and the base plates; wherein each of the vertical stacking posts has a height measured from the base frame that exceeds that of the first set of rail sections.

12. The assembly of claim 11, wherein each of the vertical stacking posts has an intermediate portion extending between a lower end portion and an upper end portion, with the intermediate portion having an intermediate maximal width, and the bottom flange portion having a bottom maximal width greater than that of the intermediate maximal width and the upper end portion has at least a portion having a width less than the bottom maximal width.

13. The assembly of claim 11, further comprising a lock member extending laterally across the base frame substantially parallel to the width dimension and contacting an upper portion of at least two of the horizontal structures, with the lock member positioned to limit vertical movement of each rail section relative to the base frame.

14. The assembly of claim 11, wherein the lower end portion of each of the first and second vertical stanchions comprises a tubular structure having an axial opening; wherein the first set of rail engagement members includes three or more substantially vertical projections, at least one of which is engaged with the tubular structure of the first vertical stanchion.

15. The assembly of claim 11, further comprising one or more wheels rotatably attached to the base frame.

16. A leading edge fall protection rail assembly comprising:
- a rectangular base frame supporting a railing storage area and a base plate storage area, with the rectangular base frame having a length dimension and a width dimension, with the length dimension being greater than and perpendicular to the width dimension;
- a set of fork channels attached to the rectangular base frame and configured to receive forklift forks;
- a first set of two or more rail sections stored side by side in a generally vertical orientation in the railing storage area, each rail section having at least first and second vertical stanchions and one or more horizontal structures extending between the vertical stanchions substantially parallel to the length dimension of the base frame, with each of the first and second vertical stanchions having a lower end portion;
- first and second opposing sets of rail engagement members within the railing storage area and fixedly attached to the base frame, with one of the first set of rail engagement members in male or female engagement with a lower end portion of one of the first vertical stanchions and one of the second sets of rail engagement members in male or female engagement with a lower end portion of one of the second vertical stanchions; and
- a lock member extending across the base frame transverse to the length dimension and adjacent to an upper portion of at least two of the horizontal structures, with the lock member positioned to limit vertical movement of each rail section relative to the base frame; and
- a first set of two or more base plates within the base plate storage area, with each base plate having a plate portion and at least first and second mounting posts extending from the plate portion, with each mounting post configured to engage in a male or female fit with at least one of the vertical stanchions to support one or more rail structures in a generally vertical orientation.

17. The assembly of claim 16, wherein each of the two or more horizontal structures includes a toe board, and the lock member contacts an upper portion of at least two of the toe boards.

18. The assembly of claim 16, wherein the lower end portion of each of the first and second vertical stanchions comprises a tubular structure having an axial opening; and wherein the first set of rail engagement members includes three or more generally vertical projections, one of which is engaged with the tubular structure of the first vertical stanchion.

19. The assembly of claim 16, further comprising: three or more substantially vertical posts extending upwardly from the base frame and configured to collectively support at least a total weight of the base frame, the first set of rail sections, the first and second opposing sets of rail engagement members, and the base plates and wherein each of the vertical posts has a height measured from the base frame that exceeds that of the first set of rail sections with each of the posts having an upper end portion.

20. The assembly of claim 16, further comprising one or more wheels rotatably attached to the base frame.

* * * * *